United States Patent
Viele et al.

(10) Patent No.: US 11,621,460 B2
(45) Date of Patent: Apr. 4, 2023

(54) SERIES BATTERIES TO REDUCE AN INTERFERING MAGNETIC FIELD

(71) Applicant: Wisk Aero LLC, Mountain View, CA (US)

(72) Inventors: Brian Robert Viele, Crozet, VA (US); Lewis Romeo Hom, Mountain View, CA (US)

(73) Assignee: Wisk Aero LLC, Mountain View, CA (US)

( * ) Notice: Subject to any disclaimer, the term of this patent is extended or adjusted under 35 U.S.C. 154(b) by 436 days.

(21) Appl. No.: 16/595,123

(22) Filed: Oct. 7, 2019

(65) Prior Publication Data

US 2020/0035976 A1     Jan. 30, 2020

Related U.S. Application Data

(63) Continuation of application No. 15/675,168, filed on Aug. 11, 2017, now Pat. No. 10,573,870.

(51) Int. Cl.
| | |
|---|---|
| *H01M 50/502* | (2021.01) |
| *H01M 10/02* | (2006.01) |
| *B64D 41/00* | (2006.01) |
| *H01M 10/42* | (2006.01) |
| *H01M 50/20* | (2021.01) |

(52) U.S. Cl.
CPC .......... *H01M 50/502* (2021.01); *B64D 41/00* (2013.01); *H01M 10/02* (2013.01); *H01M 10/425* (2013.01); *H01M 10/4207* (2013.01); *H01M 50/20* (2021.01); *H01M 2010/4271* (2013.01); *H01M 2200/20* (2013.01)

(58) Field of Classification Search
None
See application file for complete search history.

(56) References Cited

U.S. PATENT DOCUMENTS

| | | |
|---|---|---|
| 2003/0020829 A1 | 1/2003 | Croasdale |
| 2003/0091896 A1 | 5/2003 | Watanabe et al. |
| 2014/0079981 A1 | 3/2014 | Sheen et al. |
| 2015/0263389 A1 | 9/2015 | Moon |
| 2015/0333544 A1 | 11/2015 | Toya et al. |
| 2015/0340672 A1 | 11/2015 | Walpurgis |

FOREIGN PATENT DOCUMENTS

DE     102009000675 A1 *   8/2010   ........ H01M 10/0413

OTHER PUBLICATIONS

Fink et al. (DE 102009000675 A1)—machine translation.*

(Continued)

*Primary Examiner* — Haixia Zhang
(74) *Attorney, Agent, or Firm* — Kilpatrick Townsend & Stockton LLP

(57) ABSTRACT

A first portion of a series battery is arranged where the first portion of the series battery produces a first magnetic field and the series battery includes a plurality of charge storage devices, a negative output terminal, a positive output terminal, and a plurality of intradevice connections connecting the plurality of charge storage devices in series. A second portion of the series battery is arranged such that a second magnetic field produced by the second portion of the series battery at least partially cancels out the first magnetic field.

11 Claims, 19 Drawing Sheets

(56) References Cited

OTHER PUBLICATIONS

U.S. Appl. No. 15/675,168, "Non-Final Office Action" dated Nov. 15, 2017, 22 pages.
U.S. Appl. No. 15/675,168, "Final Office Action" dated Jun. 4, 2018, 28 pages.
U.S. Appl. No. 15/675,168, "Non-Final Office Action" dated Nov. 16, 2018, 28 pages.
U.S. Appl. No. 15/675,168, "Notice of Allowance" dated Jun. 28, 2019, 10 pages.

* cited by examiner

SERIES BATTERIES TO REDUCE AN INTERFERING MAGNETIC FIELD

CROSS-REFERENCE TO RELATED APPLICATIONS

This application is continuation of U.S. Non-Provisional application Ser. No. 15/675,168, filed on Aug. 11, 2017, and titled "Series Batteries To Reduce An Interfering Magnetic Field," which is hereby incorporated by reference in its entirety for all purposes.

BACKGROUND OF THE INVENTION

New types of aircraft are being developed which are powered by batteries instead of internal combustion engines. Battery-powered aircraft are attractive because they tend to be lighter than ones which are powered by internal combustion. However, in battery-powered aircraft prototypes, it has been observed that the batteries (or, more specifically, the currents output by the batteries) induce magnetic fields which in turn interfere with instruments on the aircraft. For example, a compass uses the earth's magnetic field to determine the plane's heading and the interfering magnetic field from the batteries can produce a heading error on the order of 2-10 degrees off. Techniques to reduce or zero out the interfering magnetic field produced by the batteries would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to manufacture a series battery with a reduced interfering magnetic field are described herein. In some embodiments, a first portion of a series battery is arranged where the first portion of the series battery produces a first magnetic field and the series battery includes a plurality of charge storage devices, a negative output terminal, a positive output terminal, and a plurality of intradevice connections connecting the plurality of charge storage devices in series; a second portion of the series battery is arranged such that a second magnetic field produced by the second portion of the series battery at least partially cancels out the first magnetic field. In some embodiments, the series battery is used in an aircraft which has sensitive equipment (e.g., a compass) which relies on or senses the Earth's magnetic field. Any magnetic field produced by the series battery will interfere with the aircraft's equipment, and so batteries with little or no interfering magnetic field would be desirable.

Figure 1:
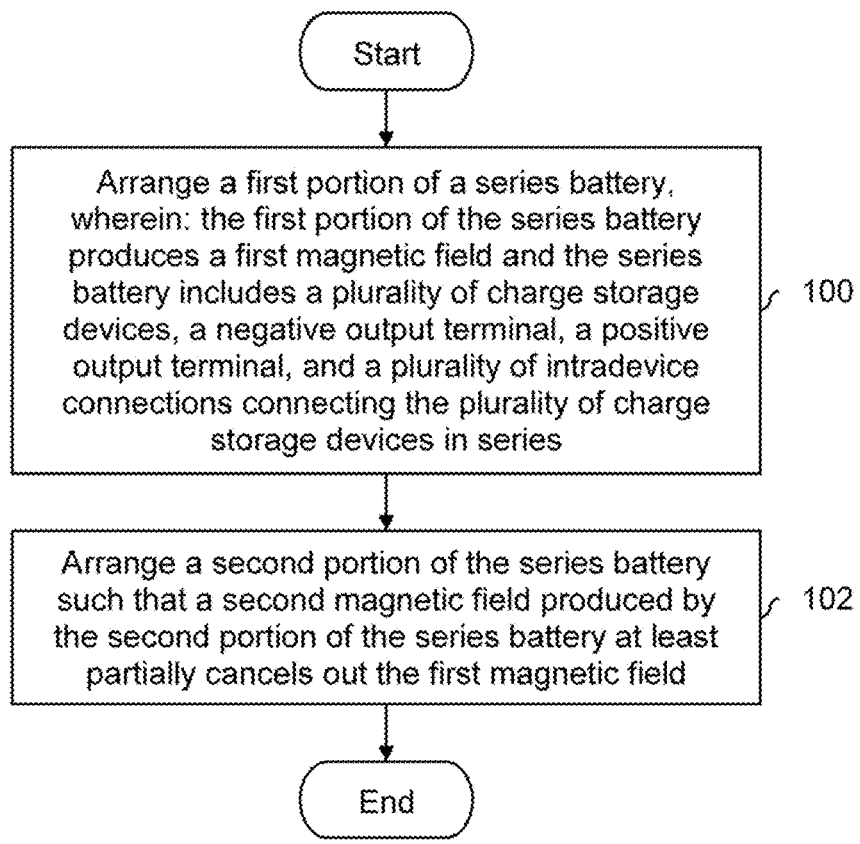
FIG. 1 is a flowchart illustrating an embodiment of a process to assemble a series battery with reduced interfering magnetic field.

FIG. 1 is a flowchart illustrating an embodiment of a process to assemble a series battery with reduced interfering magnetic field. In some embodiments, the process is performed during manufacturing or assembly of the series battery, where parts or components of the series battery are put together in a way that minimizes or otherwise reduces the overall or total magnetic field produced.

At 100, a first portion of a series battery is arranged, wherein: the first portion of the series battery produces a first magnetic field and the series battery includes a plurality of charge storage devices, a negative output terminal, a positive output terminal, and a plurality of intradevice connections connecting the plurality of charge storage devices in series. A series battery refers to batteries where the underlying or component charge storage devices are connected in series. In various embodiments, the scope, size, and/or complexity of the charge storage devices may encompass a variety of things. In one example, a charge storage device is a single battery cell. In another example, a charge storage device includes multiple battery cells connected together, all enclosed in a rigid case with a positive output terminal and a negative output terminal.

At 102, a second portion of the series battery is arranged such that a second magnetic field produced by the second portion of the series battery at least partially cancels out the first magnetic field. For example, the two portions are placed or arranged sufficiently close to each other so that the first magnetic field is canceled out (e.g., almost entirely) by the second magnetic field. The magnitudes of the two magnetic fields are the same because in a series battery (where everything is connected serially) there is only a single current loop so the same amount of current runs through all parts of the current loop. The directions of the magnetic fields are controlled by the placement or arrangement of the two portions of the series battery and step 102 orients or arranges the second portion so that its magnetic field is in the opposite direction as the direction of the first magnetic field. Thus, since the magnitudes are the same and the directions are opposite, the two magnetic fields will cancel each other out entirely.

In one example, the first portion and second portion of the series batteries are wires or connections that are arranged or laid out parallel to each other with the currents running in opposite directions (e.g., so that the resulting magnetic fields are in opposite directions). In another example, the first portion and second portion of the series batteries are battery modules (e.g., with a plurality of battery cells in a case, sometimes referred to as a battery pack). One battery module may be flipped upside down so that its magnetic field cancels out the magnetic field of an adjacent battery module.

In some embodiments, the cancellation or reduction of interfering magnetic fields is sufficient to bring a heading error at a victim compass to be within 2 degrees (e.g., were 2 degrees is an acceptable amount of heading errors) where the victim compass is located 8 feet from the series battery.

In some embodiments, the series battery which is assembled per the process of FIG. 1 is used in a battery-powered aircraft (e.g., there is no internal combustion engine and the aircraft is completely electric). Some other series batteries which are produced or otherwise assembled using other techniques may produce total or overall magnetic fields which interfere with the aircraft's instruments. For example, an aircraft's compass uses the earth's magnetic field to determine the aircraft's heading (e.g., specified in degrees) and the interfering magnetic field produced by a series battery (assembled without consideration of the resulting magnetic field) introduces a heading error, for example on the order of 5-10 degrees off the actual heading. A compass is merely one example of an instrument or device which is adversely affected by an interfering magnetic field; more generally such devices are referred to as victim devices.

This problem is particularly acute and/or observable for battery-powered aircraft for a number of reasons. First, in a battery-powered aircraft, the amount of current drawn can be quite high at times. For example, if the aircraft takes off and lands vertically then the current draw will be quite high at those times. This means that the magnitude or strength of the interfering magnetic field will be similarly high. In contrast, an aircraft with an internal combustion engine will not have currents of that magnitude and so any interfering magnetic field that is induced is much smaller and may not be noticeable.

Another reason why magnetic interference is such a problem for battery-powered aircraft is that battery-powered aircraft tend to be single-occupant aircraft and/or relatively small. For example, in one aircraft of interest, the nose-to-tail length is on the order of 10 feet. This limits the separation that can be put between the victim device (e.g., a compass) and the source(s) of the interfering magnetic field.

The following figures describe examples of FIG. 1 in more detail. First, some examples where the first portion and second portion of the series batteries are wires or connections are described. Then, some examples where the first portion and second portion of the series batteries are battery modules are described.

Figure 2:
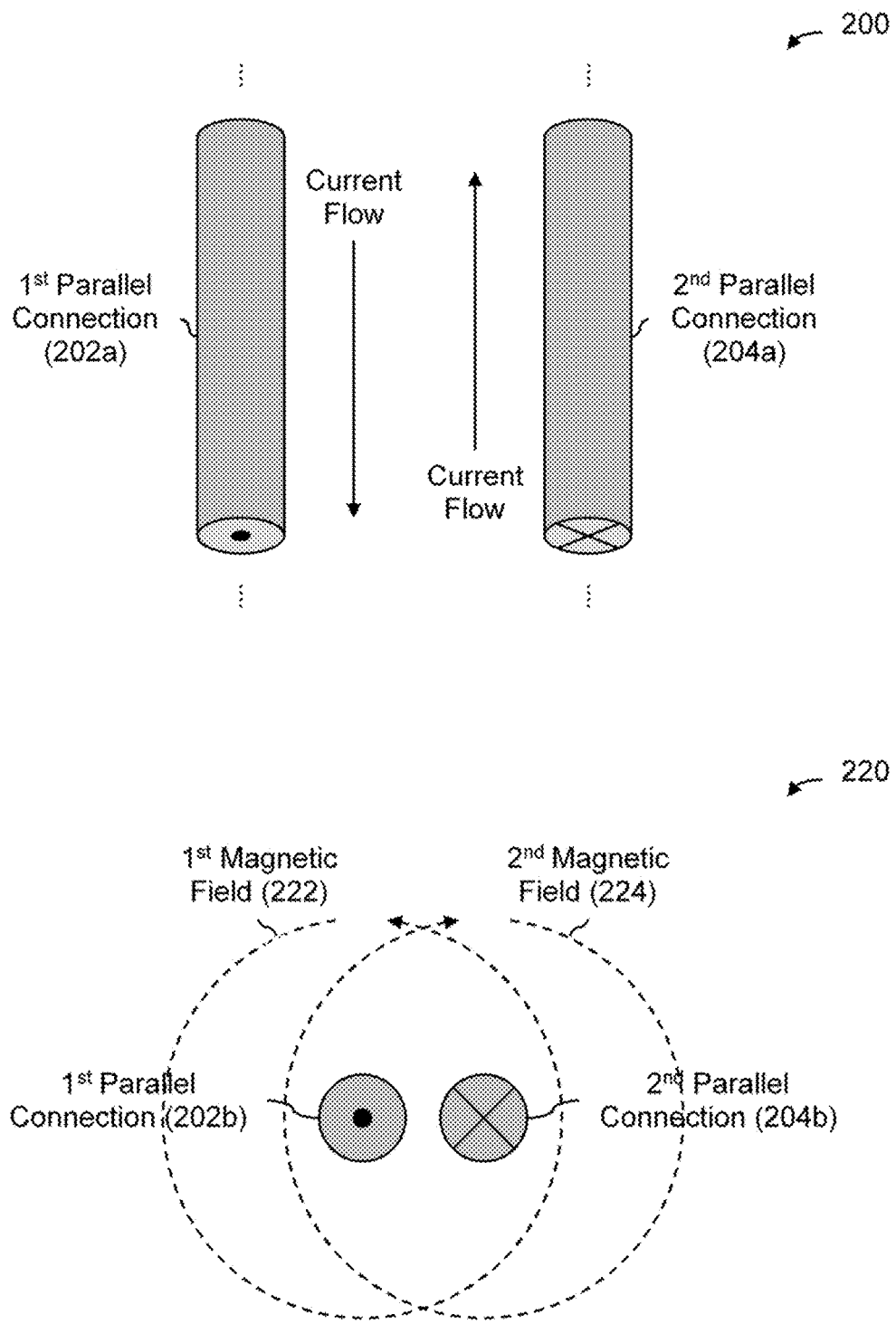
FIG. 2 is a diagram illustrating an embodiment of two parallel connections with current flowing in opposite directions.

FIG. 2 is a diagram illustrating an embodiment of two parallel connections with current flowing in opposite directions. Diagram 200 shows a top view of a first connection (202a) and a second connection (204a) which run parallel to each other. The parallel connections (202a and 204a) may be from any part or section of the system. For example, the parallel connections may be intradevice connections which connect the plurality of charge storage devices in series (see, e.g., the reference to intradevice connections in step 100 of FIG. 1). Or, the parallel connections may be related to or touching the negative output terminal and the positive output terminal. As shown in diagram 200, in the first parallel connection (202a), the current is flowing downward; in the second parallel connection (204a), the current is flowing upward.

Diagram 220 shows a cross sectional view of the first parallel connection (202b) and the second parallel connection (204b). As shown here, the first magnetic field (222) produced by the first parallel connection (202b) is in the counter clockwise direction and the second magnetic field (224) produced by the second parallel connection (204b) is in the clockwise direction. The magnitudes of the two fields (222 and 224) are the same (e.g., because a series battery only has a single current loop and two identical amounts of current will produce magnetic fields of identical strength) and they are in opposite directions so the two magnetic fields cancel each other out completely.

The connections shown here may be implemented in a variety of ways. For example, the connections could be copper wires. Or, sometimes a connection runs through a printed circuit board and the connections may be a trace or connection in a printed circuit board.

The following figure describes this example more formally and/or generally in a flowchart.

Figure 3:
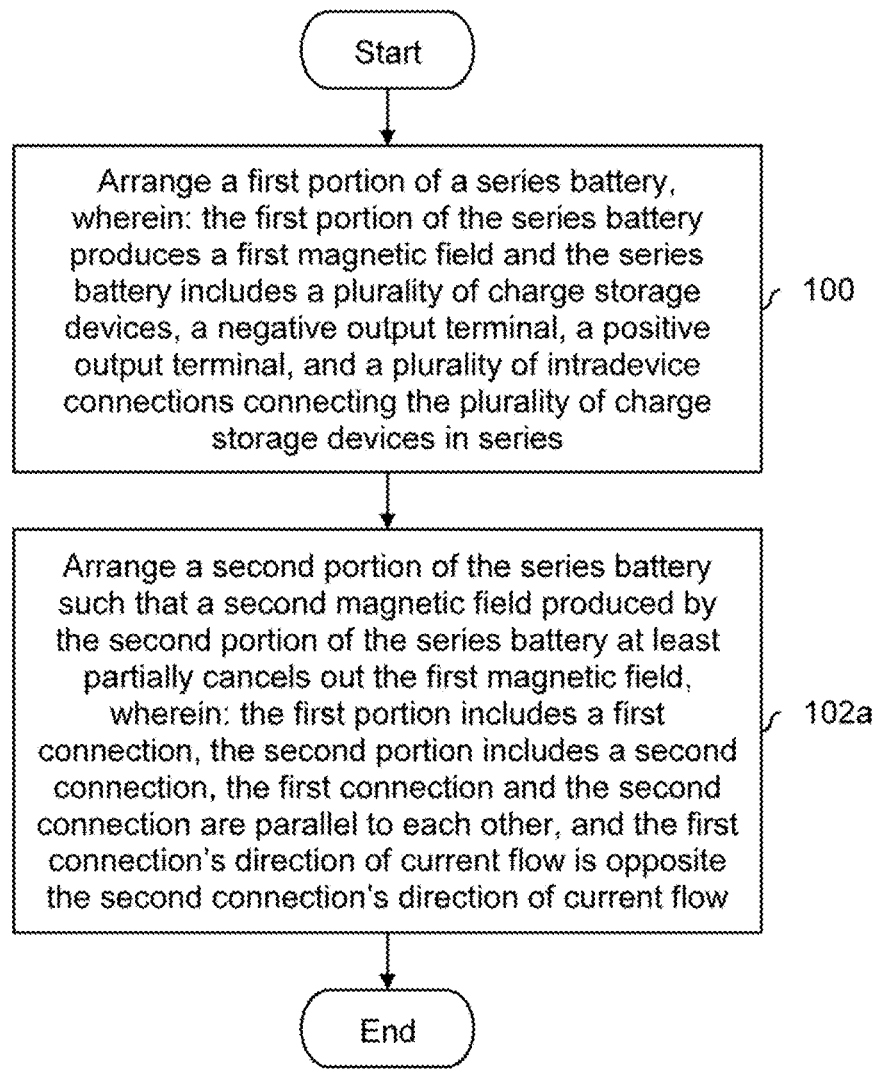
FIG. 3 is a flowchart illustrating an embodiment of a process to assemble a series battery with two parallel connections arranged so that the resulting magnetic fields cancel each other out.

FIG. 3 is a flowchart illustrating an embodiment of a process to assemble a series battery with two parallel connections arranged so that the resulting magnetic fields cancel each other out. FIG. 3 is related to FIG. 1 and for convenience similar reference numbers are used to show related steps.

At 100, a first portion of a series battery is arranged, wherein: the first portion of the series battery produces a first magnetic field and the series battery includes a plurality of charge storage devices, a negative output terminal, a positive output terminal, and a plurality of intradevice connections connecting the plurality of charge storage devices in series. For example, in FIG. 2, the first parallel connection (202a/202b) would be laid out or arranged.

At 102a, a second portion of the series battery is arranged such that a second magnetic field produced by the second portion of the series battery at least partially cancels out the first magnetic field, wherein: the first portion includes a first connection, the second portion includes a second connection, the first connection and the second connection are parallel to each other, and the first connection's direction of current flow is opposite the second connection's direction of current flow. For example, in FIG. 2, the second parallel connection (204a/204b) would be laid out or arranged. As described above, the parallel connections may be copper wires or may be connections or traces in a printed circuit board.

The following figures show some specific examples of where parallel connections may be in a system.

Figure 4:
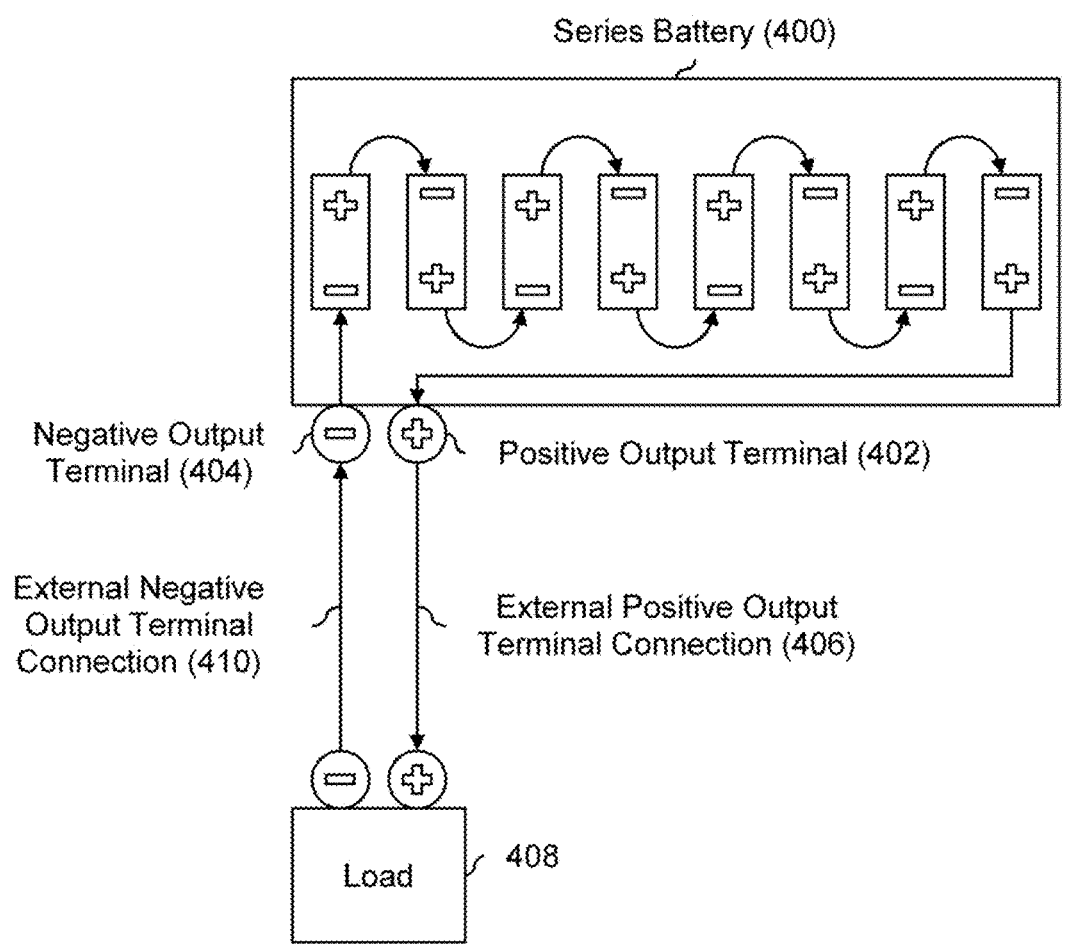
FIG. 4 is a diagram illustrating an embodiment of a series battery with an external positive output terminal connection and an external negative output terminal connection that are parallel to each other.

FIG. 4 is a diagram illustrating an embodiment of a series battery with an external positive output terminal connection and an external negative output terminal connection that are parallel to each other. In the example shown, a series battery (400) has a positive output terminal (402) and a negative output terminal (404). For example, the series battery has a case and the only exposed electrical connections are the positive output terminal and the negative output terminal.

An external positive output terminal connection (406) connects the positive output terminal (402) to a load (408). Similarly, an external negative output terminal connection (410) connects the negative output terminal (404) to the load (408). For simplicity and brevity, only a single load is shown here but the load may comprise multiple devices arranged in a variety of ways (e.g., in parallel, in series, including switches to select only certain devices, including voltage converters to step up/down the voltage, etc.).

The following figure describes this example more formally and/or generally in a flowchart.

Figure 5:
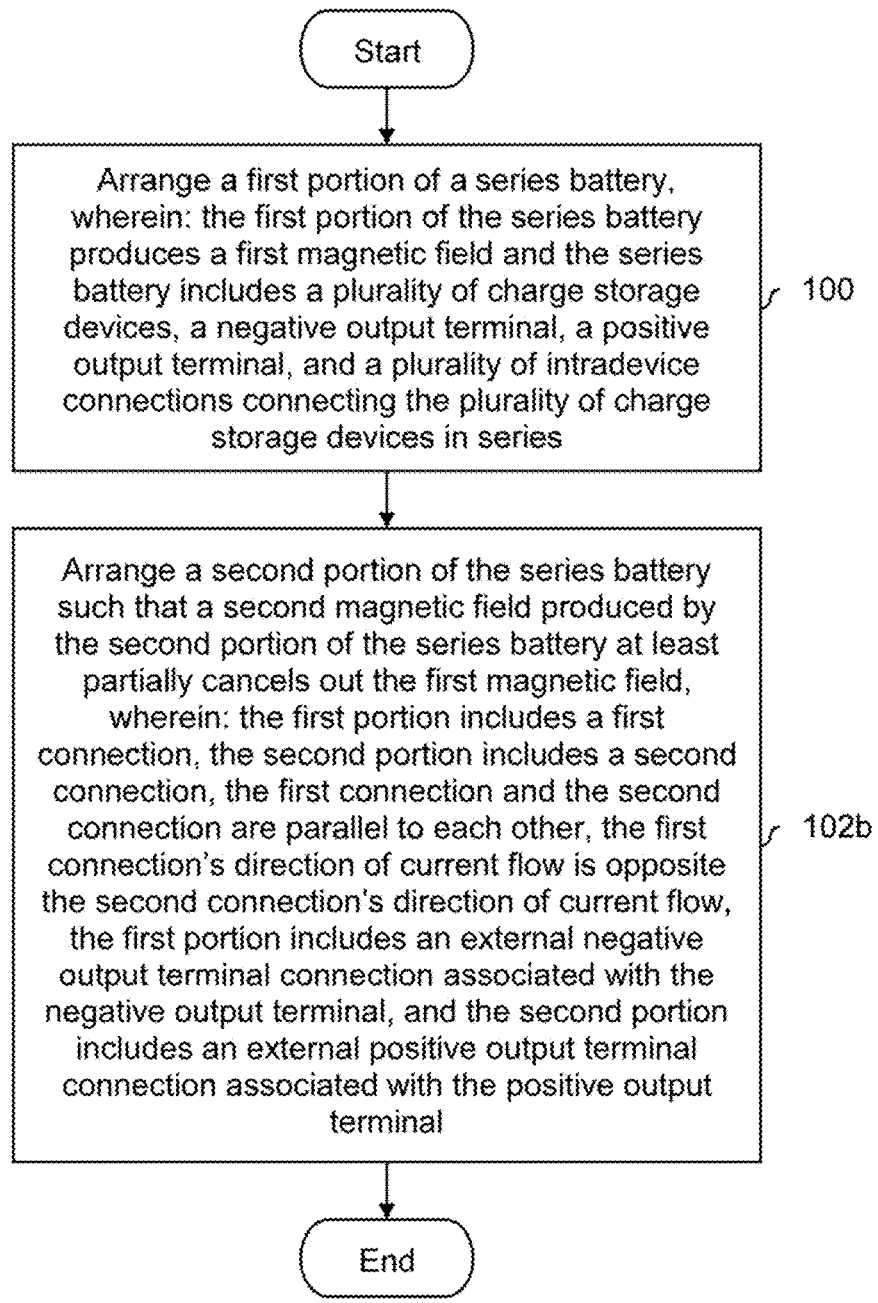
FIG. 5 is a flowchart illustrating an embodiment of a process to assemble a series battery with an external positive output terminal connection and an external negative output terminal connection that are parallel to each other.

FIG. 5 is a flowchart illustrating an embodiment of a process to assemble a series battery with an external positive output terminal connection and an external negative output terminal connection that are parallel to each other. FIG. 5 is related to FIG. 1 and for convenience similar reference numbers are used to show related steps.

At 100, a first portion of a series battery is arranged, wherein: the first portion of the series battery produces a first magnetic field and the series battery includes a plurality of charge storage devices, an external negative output terminal, an external positive output terminal, and a plurality of intradevice connections connecting the plurality of charge storage devices in series. See, for example, the external positive output terminal connection (406) in FIG. 4.

At 102b, a second portion of the series battery is arranged such that a second magnetic field produced by the second portion of the series battery at least partially cancels out the first magnetic field, wherein: the first portion includes a first connection, the second portion includes a second connection, the first connection and the second connection are parallel to each other, the first connection's direction of current flow is opposite the second connection's direction of current flow, the first portion includes an external negative output terminal connection associated with the negative output terminal, and the second portion includes an external positive output terminal connection associated with the positive output terminal. See, for example, the external negative output terminal connection (410) in FIG. 4.

In some embodiments, two parallel connections with cancelling magnetic fields are intradevice connections which connect charge storage devices in series in a series battery. The following figures show some examples of this.

Figure 6:
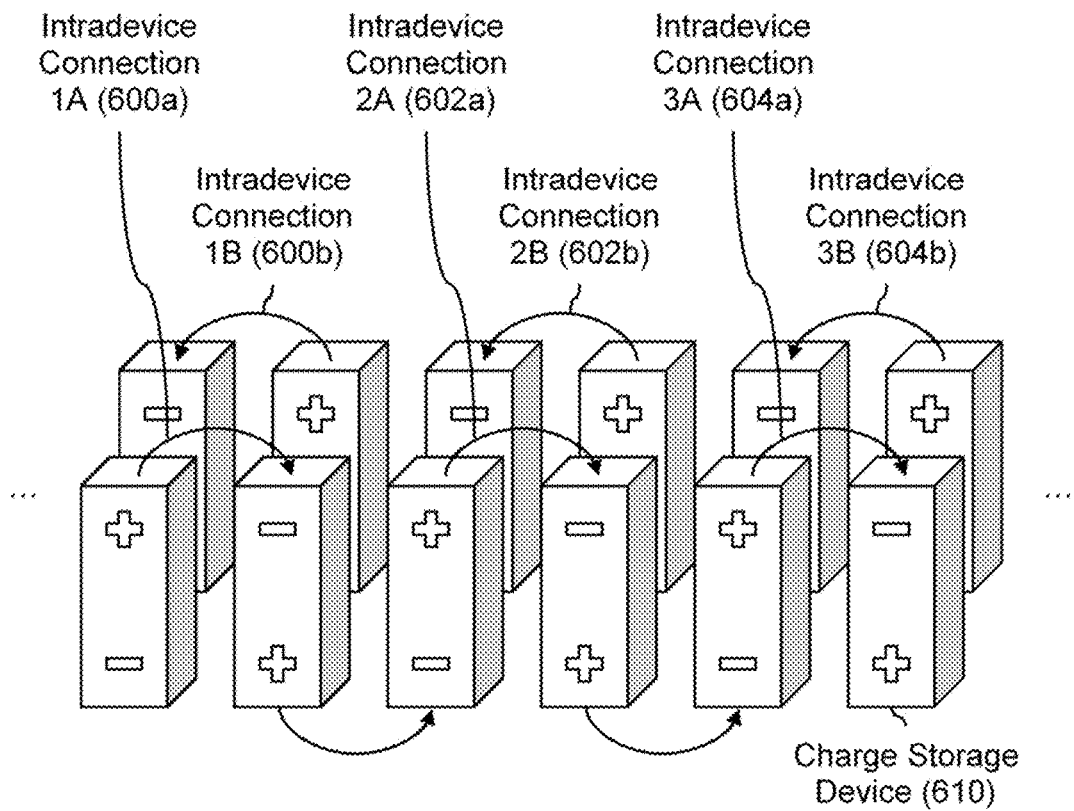
FIG. 6 is a diagram illustrating an embodiment of parallel intradevice connections which connect charge storage devices with output terminals on opposite surfaces.

FIG. 6 is a diagram illustrating an embodiment of parallel intradevice connections which connect charge storage devices with output terminals on opposite surfaces. In this example, two rows of charge storage devices (610) connected in series are shown. The charge storage devices are identical with the same height (h), width (w), and depth (d). To achieve a particular orientation (e.g., positive side up or negative side up), the charge storage device may be flipped upside down if needed. In this example, the charge storage devices (610) are shown as rectangular cuboids with the positive output terminal on one surface and the negative output terminal on the opposite surface. In both the front row and back row, the charge storage devices are oriented with alternating polarities or signs facing up (e.g., in the front row from left to right: positive facing up, negative facing up, etc.).

Each intradevice connection in the front row has a corresponding intradevice connection in the back row where the two magnetic fields cancel each other out. For example, intradevice connection 1A (600a) is parallel to and has an opposite direction of current flow as intradevice connection 1B (600b). As such, the magnetic fields produced by the current flowing through intradevice connection 1A (600a) and intradevice connection 1B (600b) cancel each other out. Similarly, intradevice connection 2A (602a) and intradevice connection 2B (602b) are parallel with opposite directions of current flow and their magnetic fields cancel each other out; intradevice connection 3A (604a) and intradevice connection 3B (604b) are parallel with opposite directions of current flow so that their magnetic fields cancel each other out.

Although only the more visible intradevice connections on the tops of the charge storage devices have been discussed so far, the intradevice connections on the bottoms of the charge storage devices also are arranged in a way that causes magnetic fields to cancel each other out. For brevity and because some of those bottom intradevice connections are not as visible from the view shown, they are not discussed further.

In this diagram, the front row and back row are shown with sufficient spacing to make the intradevice connections and positive/negative signs easier to see. In some embodiments, the front row and back row are packed together as closely as possible in order to get corresponding intradevice connections closer to each other. A tighter packing will improve the density (e.g., so that more charge can be stored per volume of space). Also, placing two parallel connections closer to each other tends to improve the cancellation between the resulting magnetic fields. To put it another way, a compass or other victim device will tend to observe less total or overall interfering magnetic field (e.g., after any cancellations) if the two parallel connections are closer to each other.

Figure 7:
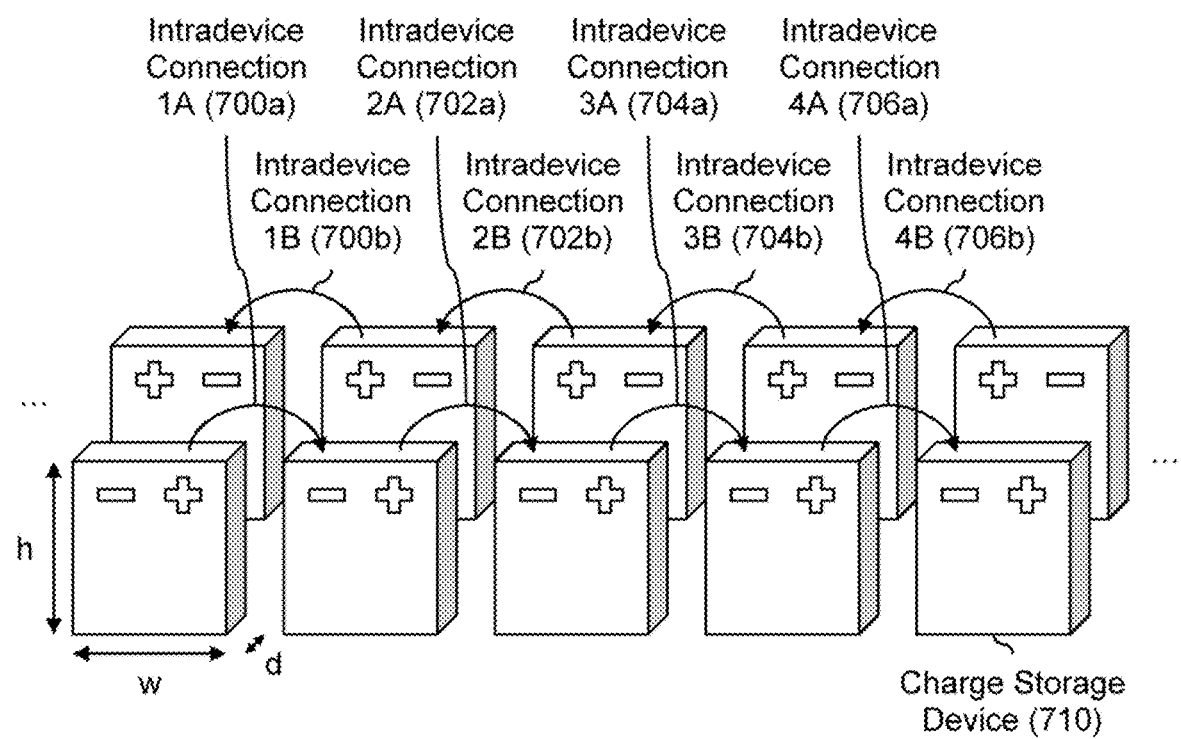
FIG. 7 is a diagram illustrating an embodiment of parallel intradevice connections which connect charge storage devices with output terminals on a same surface.

FIG. 7 is a diagram illustrating an embodiment of parallel intradevice connections which connect charge storage devices with output terminals on a same surface. FIG. 7 is similar to FIG. 6, except in this example the positive output terminal and negative output terminal are on the same surface of the rectangular cuboids. As before, all of the charge storage devices are identical with the same height (h), width (w), and depth (d) and the charge storage device may be flipped or otherwise rotated to achieve a desired orientation (e.g., positive side on left and negative side on right). In one example, some types of battery cells have tabs (i.e., a positive output terminal and a negative output terminal) which come out of the battery cell on the same side.

As before, each intradevice connection in the front row has a corresponding connection in the back row where the two connections are parallel and have current flows in opposite directions. As a result of this, the magnetic field associated with intradevice connection 1A (700a) cancels out the magnetic field associated with intradevice connection 1B (700b), the magnetic field associated with intradevice connection 2A (702a) cancels out the magnetic field associated with intradevice connection 2B (702b), the magnetic field associated with intradevice connection 3A (704a) cancels out the magnetic field associated with intradevice connection 3B (704b), and the magnetic field associated with intradevice connection 4A (706a) cancels out the magnetic field associated with intradevice connection 4B (706b).

In the arrangement shown here, the charge storage devices (710) are arranged or otherwise laid out so that each intradevice connection (e.g., 700a) is as close as possible to its corresponding intradevice connection (700b), given the exemplary dimensions where d<<h and d<<w (i.e., the depth is much smaller than the width and the height). As in the previous diagram, the components are shown here with sufficient spacing so that the intradevice connections and positive/negative signs can be easily read. However, in a real world implementation, the charge storage devices may be packed much tighter (e.g., directly touching or minimally separated by insulation or some other thin buffer). If the charge storage devices are packed together, the distance between one intradevice connection (e.g., 700a) and a corresponding intradevice connection (e.g., 700b) would be ~d. Since d is the smallest dimension, this is the arrangement that puts corresponding intradevice connections as close as possible to each other given d<<h and d<<w.

The following figure describes these intradevice connection examples more formally and/or generally in a flowchart.

Figure 8:
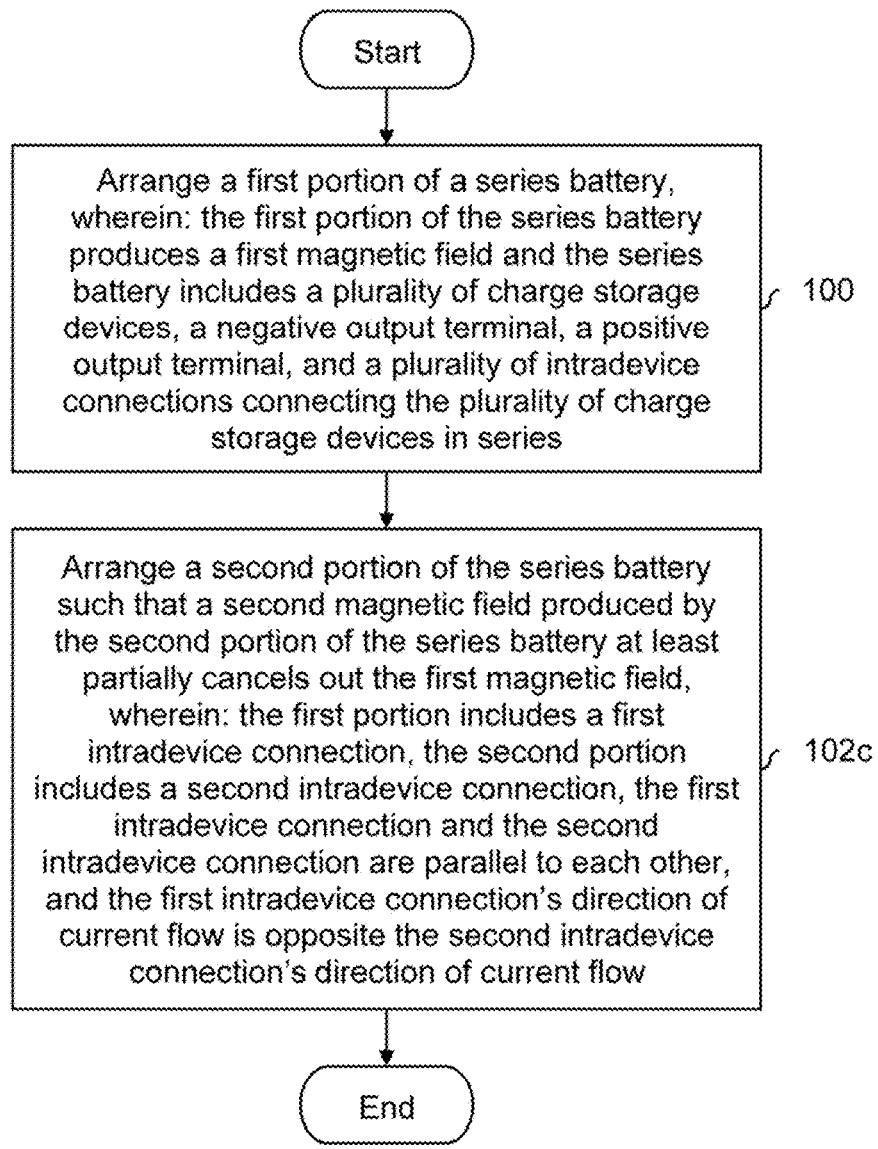
FIG. 8 is a flowchart illustrating an embodiment of a process to assemble a series battery with intradevice connections that are parallel to each other.

FIG. 8 is a flowchart illustrating an embodiment of a process to assemble a series battery with intradevice connections that are parallel to each other. FIG. 8 is related to FIG. 1 and for convenience similar reference numbers are used to show related steps.

At 100, a first portion of a series battery is arranged, wherein: the first portion of the series battery produces a first magnetic field and the series battery includes a plurality of charge storage devices, a negative output terminal, a positive output terminal, and a plurality of intradevice connections connecting the plurality of charge storage devices in series. For example, in FIG. 6, intradevice connection 1A (600a) shows one example of a first portion of a series battery that is arranged at step 100. In FIG. 7, intradevice connection 1A (700a) shows another example of a first portion of a series battery that is arranged at step 100.

At 102c, a second portion of the series battery is arranged such that a second magnetic field produced by the second portion of the series battery at least partially cancels out the first magnetic field, wherein: the first portion includes a first intradevice connection, the second portion includes a second intradevice connection, the first intradevice connection and the second intradevice connection are parallel to each other, and the first intradevice connection's direction of current flow is opposite the second intradevice connection's direction of current flow. To continue the examples from above, see intradevice connection 1B (600b) in FIG. 6 and intradevice connection 1B (700b) in FIG. 7 which are both arranged so that they are parallel to and have current flows in the opposite direction as their corresponding intradevice connection. In FIG. 6, the magnetic field from intradevice connection 1A (600a) will cancel out the magnetic field from intradevice connection 1B (600b) and in FIG. 7, the magnetic field from intradevice connection 1A (700a) will cancel out the magnetic field from intradevice connection 1B (700b).

In the previous examples, the intradevice connections connect adjacent or neighboring charge storage devices. The following figures show some examples where the intradevice connections connect non-adjacent charge storage devices and are arranged so that the resulting magnetic fields cancel each other out.

Figure 9:
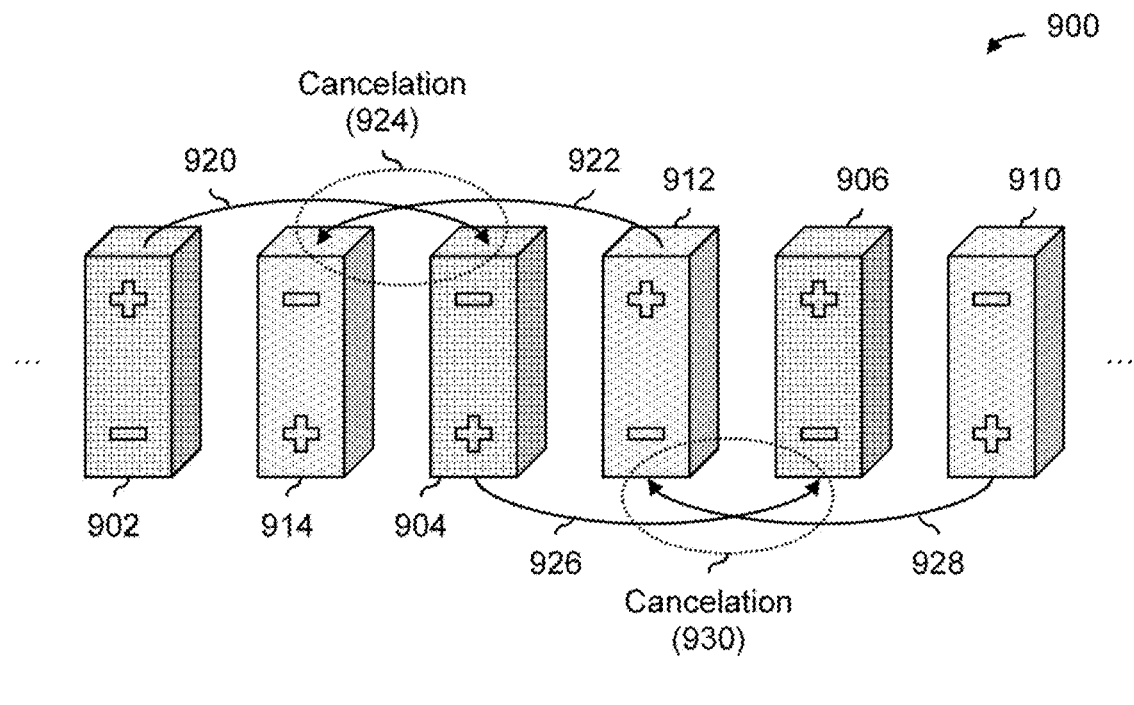
FIG. 9 is a diagram illustrating some embodiments of parallel intradevice connections which connect non-adjacent charge storage devices.
Figure 9:
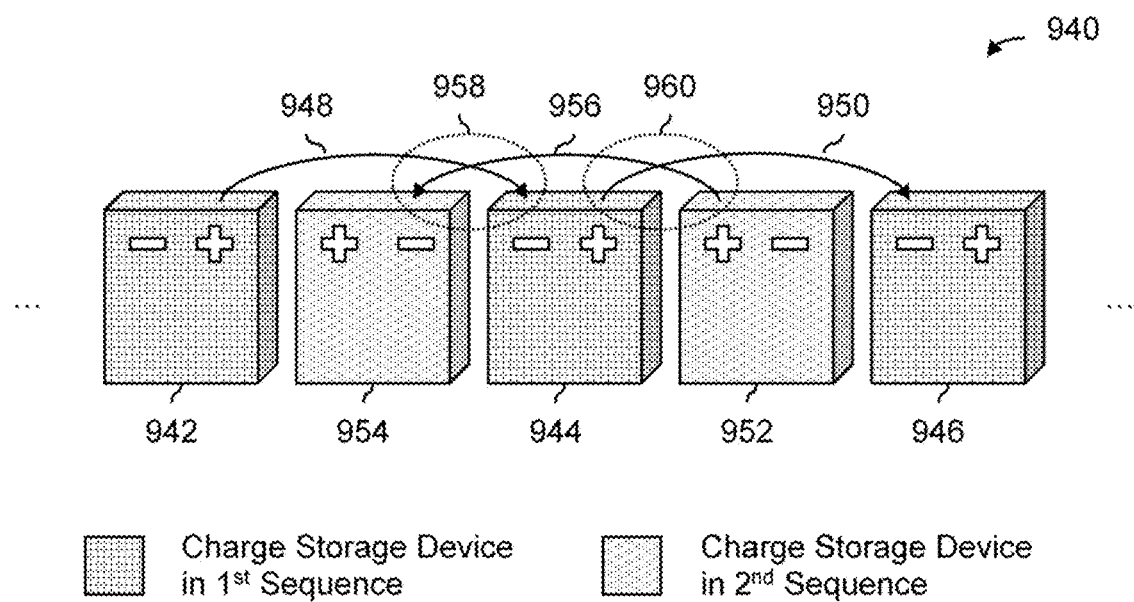

FIG. 9 is a diagram illustrating some embodiments of parallel intradevice connections which connect non-adjacent charge storage devices. Diagram 900 shows an example where all of the charge storage devices are identical and the charge storage devices have a positive output terminal on one surface and a negative output terminal on an opposite surface. In this example, there are two sequences of interleaved charge storage devices. The first sequence (shown with solid pattern) includes a first charge storage device (902) which is connected to a non-adjacent second charge storage device (904) which in turn is connected to a non-adjacent third charge storage device (906). The current flows from left to right in this first sequence. The second sequence (shown with striped pattern) includes a fourth charge storage device (910) which is connected to a non-adjacent fifth charge storage device (912) which in turn is connected to a non-adjacent sixth charge storage device (914). The current flows from right to left in this second sequence. The two sequences are interleaved or alternating. For example, going from left to right: a charge storage device from the first sequence is followed by a charge storage device from the second sequence, and so on.

The resulting magnetic fields at least partially cancel each other out. For example, the magnetic field associated with a first intradevice connection (920) is at least partially canceled out by the magnetic field associated with a second intradevice connection (922), specifically and/or the most in cancellation region 924 (e.g., where the intradevice connections 920 and 922 overlap). Similarly, the arrangement or placement of a third intradevice connection (926) and a fourth intradevice connection (928) will cause the resulting magnetic fields to at least partially cancel each other out, specifically and/or the most in cancellation region 930 (e.g., where the intradevice connections 926 and 928 overlap).

Diagram 940 is similar to diagram 900 except the charge storage devices have their positive output terminals and negative output terminals on the same surface. Charge storage devices 942, 944, and 946 are part of a first sequence (shown with grid pattern). They are connected together in series by intradevice connections 948 and 950 where the current runs from left to right. Charge storage devices 952 and 954 are part of a second sequence (shown with dotted pattern) which are connected together in series by intradevice connections 956. As in the previous example, there is some cancellation, specifically where two connections run adjacent to each other with their currents running in opposite directions. See, for example, cancellation region 958 and 960.

In some embodiments, this arrangement (e.g., where non-adjacent charge storage devices are connected) is used because a particular form factor or volume is desired or imposed which permits only a single row of cells. If a single row of charge storage devices were connected in series with neighbor to neighbor, then no cancellation would occur at all. To put it another way, although the arrangement shown here may not necessarily zero out the total magnetic field, some reduction in an interfering magnetic field may be better than no reduction at all (e.g., given some design consideration or constraint) and/or make the longer connection lengths an acceptable tradeoff.

In some embodiments, design constraints do not preclude the use of another row of charge storage devices with this technique (e.g., where non-adjacent charge storage devices are connected). If desired and permitted, another row of charge storage devices may be used to further reduce the total or overall magnetic field (e.g., FIG. 9 may be combined with FIG. 6 or FIG. 7). Or, to put it another way, three or more portions of a series battery may be arranged so that the resulting magnetic fields cancel each other out (at least to some degree).

The following figure describes these examples more formally and/or generally in a flowchart.

Figure 10:
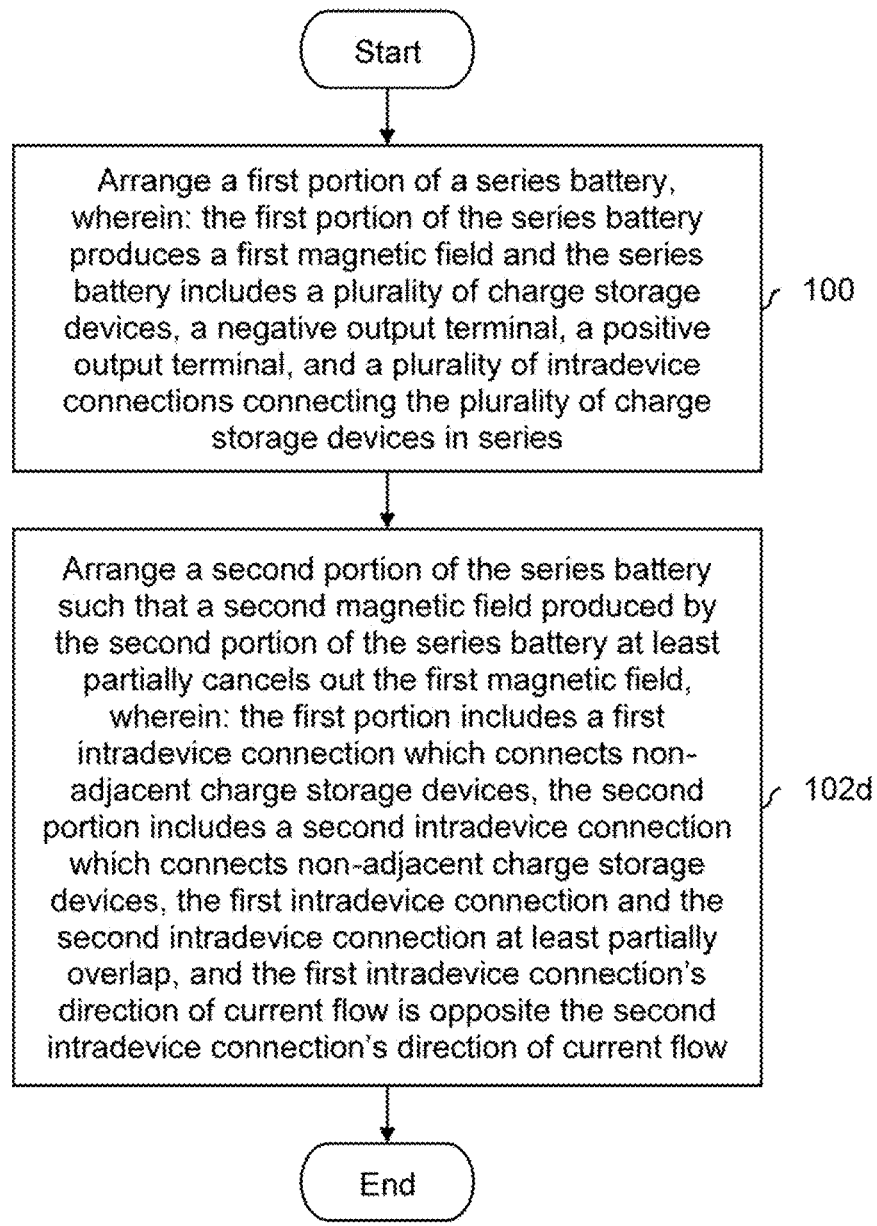
FIG. 10 is a flowchart illustrating an embodiment of a process to assemble a series battery with at least partially overlapping intradevice connections.

FIG. 10 is a flowchart illustrating an embodiment of a process to assemble a series battery with at least partially overlapping intradevice connections. FIG. 10 is related to FIG. 1 and for convenience similar reference numbers are used to show related steps.

At 100, a first portion of a series battery is arranged, wherein: the first portion of the series battery produces a first magnetic field and the series battery includes a plurality of charge storage devices, a negative output terminal, a positive output terminal, and a plurality of intradevice connections connecting the plurality of charge storage devices in series. For example, intradevice connection 920 and intradevice connection 948 in FIG. 9 show some examples of a first portion of the series battery.

At 102d, a second portion of the series battery is arranged such that a second magnetic field produced by the second portion of the series battery at least partially cancels out the first magnetic field, wherein: the first portion includes a first intradevice connection which connects non-adjacent charge storage devices, the second portion includes a second intradevice connection which connects non-adjacent charge storage devices, the first intradevice connection and the second intradevice connection at least partially overlap, and the first intradevice connection's direction of current flow is opposite the second intradevice connection's direction of current flow. In FIG. 9, for example, intradevice connection 922 and intradevice connection 956 show some examples of a second portion of a series battery. As shown there, intradevice connection 920 at least partially overlaps with intradevice connection 922, and intradevice connection 948 at least partially overlaps with intradevice connection 956.

As described above, although the magnetic field cancellation may be only partial, in some applications it is desirable to have some cancellation as opposed to no cancellation, or there may be additional cancellation techniques that are employed to further reduce the interfering magnetic field.

As shown in the previous examples, a variety of arrangements and combinations of techniques may be used. In some embodiments, two or more adjacent charge storage devices are skipped between connected devices. Charge storage devices and their connections may be arranged and/or connected in any manner and the examples described herein are merely exemplary and are not intended to be limiting.

Returning briefly to FIG. 1, in some embodiments, the first portion and second portion of the series battery with magnetic fields which at least partially cancel each other out are battery modules, sometimes referred to as battery packs. The following figures describe some examples of this.

Figure 11:
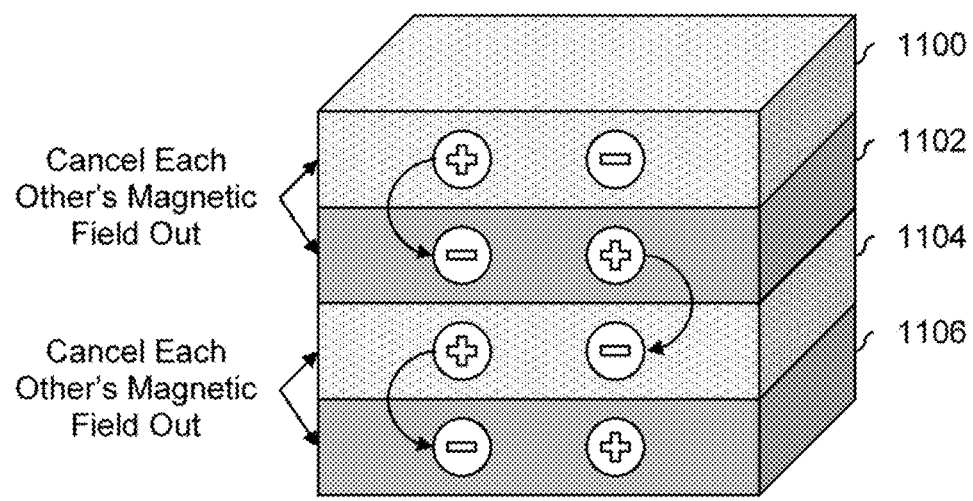
FIG. 11 is a diagram illustrating an embodiment of a rectangular cuboid battery module.
Figure 11:
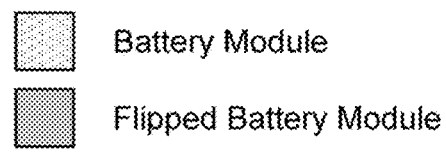

FIG. 11 is a diagram illustrating an embodiment of a rectangular cuboid battery module. In the example shown, four battery modules are shown connected together in series. For example, each battery module has a (e.g., rigid) case in which a plurality of battery cells are encased and electrically connected together. In some embodiments, one or more of the magnetic field reduction techniques described above is/are used to reduce the magnetic field produced by one of the battery modules.

The battery modules are arranged in alternating order so that every other battery module is flipped or otherwise rotated. For example, battery module 1100 (at the top) is connected in series to battery module 1102 (the next battery down) which is flipped relative to the orientation of battery module 1100. Note, for example, that battery module 1100 has its positive output terminal on the left and its negative output terminal on the right whereas battery module 1102 has it reversed.

The next battery in the series connection (i.e., battery module 1104, third from the top) is in the regular or right side up orientation and the last battery in the series connection (i.e., battery module 1106, at the bottom) is flipped upside down. With this arrangement, battery module 1100 and battery module 1102 will cancel each other's magnetic field and battery module 1104 and battery module 1106 will similarly cancel out each other's magnetic field as well. The following figure shows an example of the contents of the battery modules (1100, 1102, 1104, and 1106) to better illustrate this.

Figure 12:
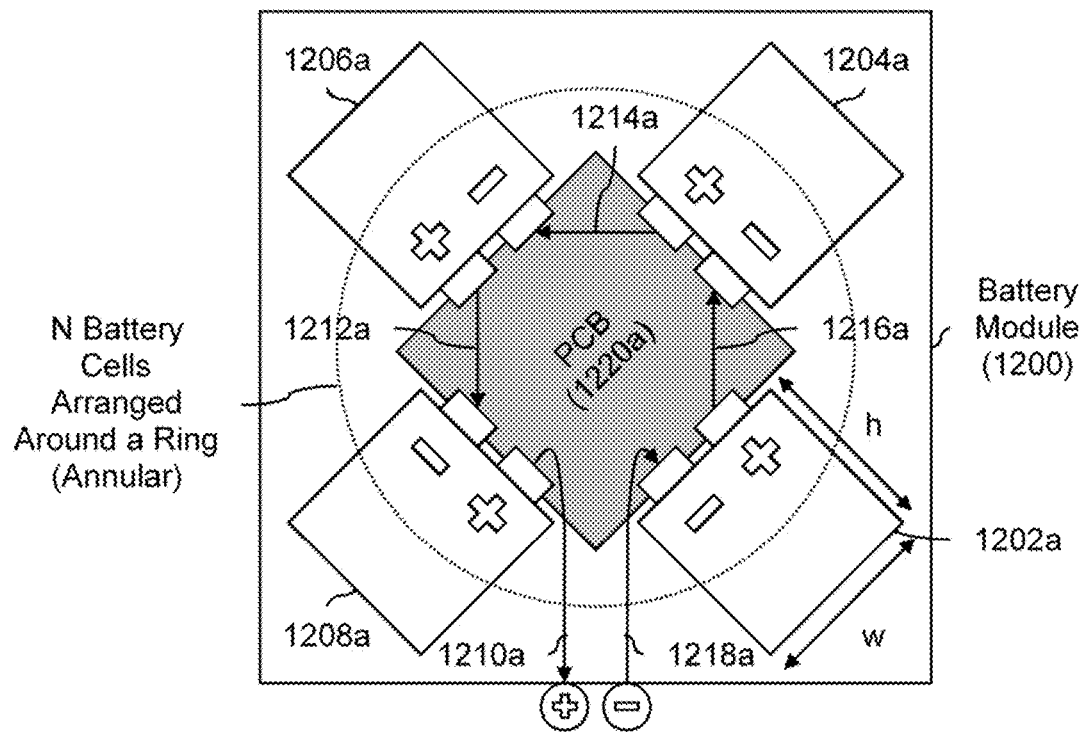
FIG. 12 is a diagram illustrating an embodiment of a rectangular cuboid battery module with battery cells arranged flat within the battery module.
Figure 12:
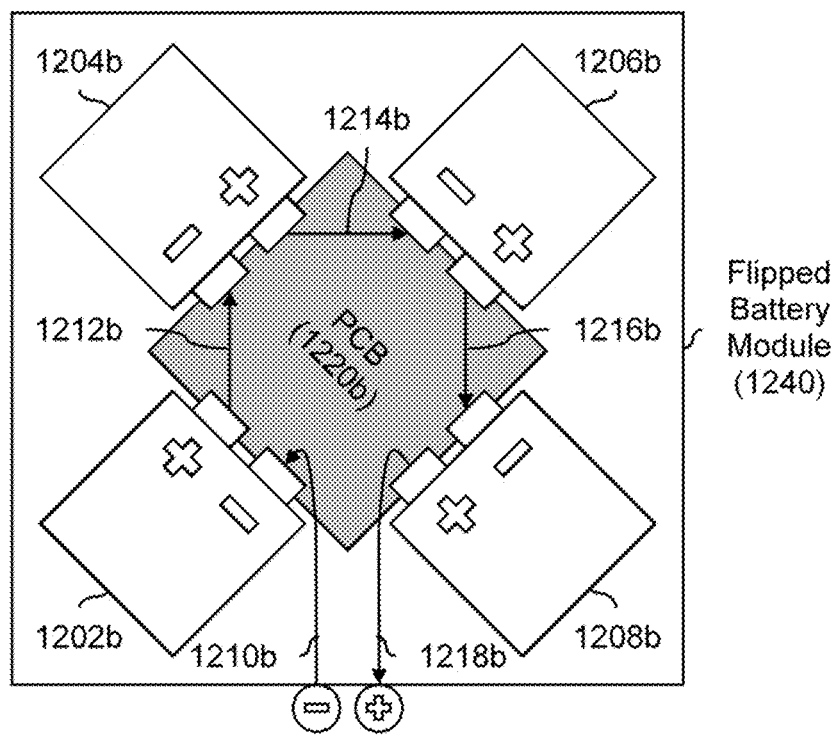

FIG. 12 is a diagram illustrating an embodiment of a rectangular cuboid battery module with battery cells arranged flat within the battery module. In this example, battery module 1200 shows the contents of battery modules 1100 and 1104 in FIG. 11 and flipped battery module 1240 shows the contents of flipped battery modules 1102 and 1106 in FIG. 11.

In this example, the battery module (1200) includes four battery cells (1202a, 1204a, 1206a, and 1208a) which are connected together in series. A printed circuit board (PCB) 1220a sits in the middle of the battery module (1200) and the positive and negative tabs of the battery cells overlap the PCB so that the PCB can electrically connect the four battery cells to each other in series. To put it another way, intracell connections 1212a, 1214a, and 1216a (referred to more generally as intradevice connections) are implemented as traces or routes on the PCB. In some embodiments, using a PCB (e.g., instead of wires) to connect the battery cells may be desirable because it is faster to assemble, the connections are less likely to break, and the PCB provides better structural integrity.

Flipped battery module 1240 is identical to battery module 1200 except it has been flipped or otherwise rotated. Similar reference numbers are used to indicate corresponding elements or components. For example, intracell connections 1212a, 1214a, and 1216a correspond respectively to intracell connections 1212b, 1214b, and 1216b and battery cells 1202a, 1204a, 1206a, and 1208a correspond respectively to battery cells 1202b, 1204b, 1206b, and 1208b.

When battery module 1200 and flipped battery module 1240 are placed next to each other, the magnetic fields will cancel. Conceptually, if each battery module is thought of as having multiple magnetic fields (e.g., each magnetic field coming from a different connection), then conceptually the magnetic field induced by the current flowing through one connection will be canceled out by the magnetic field from a corresponding connection in the flipped battery module. For example, internal positive output terminal connection 1210a and internal positive output terminal connection 1210b will cancel each other's magnetic field out, intracell connection 1212a and intracell connection 1212b will cancel each other's magnetic field out, intracell connection 1214a and intracell connection 1214b will cancel each other's magnetic field out, intracell connection 1216a and intracell connection 1216b will cancel each other's magnetic field out, and internal negative output terminal connection 1218a and internal negative output terminal connection 1218b will cancel each other's magnetic field out. Or, if the battery modules are thought of as producing a single, combined magnetic field, then conceptually the combined or total magnetic field from one battery module will be canceled out by the magnetic field from the flipped battery module.

By laying the battery cells out flat in the battery module as shown here, when two battery modules are placed next to each other as shown in FIG. 11 (e.g., battery module 1100 and 1102), the connections in adjacent battery modules will be as close as possible (e.g., given battery cell dimensions where d<<w and d<<h). Having corresponding connections be closer to each other is good for magnetic field cancellation and so this configuration (e.g., where the battery cells are laid out flat) may be desirable. To put it more formally, the battery cells (1202a/b, 1204a/b, 1206a/b, and 1208a/b) are oriented so the shortest battery cell edge (in this example, the edge which comes out of the page and which corresponds to depth) is perpendicular to the surface of the battery cell which comes into contact with an adjacent battery cell (in this example, parallel to the page).

Although only four battery cells are shown in this arrangement, any number of battery cells (n) may be arranged in an annular arrangement along a ring or circle. In this example, the battery cells are in an annular arrangement with the battery cells laid out flat. In the following example, the battery cells are also in an annular arrangement, but the battery cells are laid out on their sides in the battery module.

Figure 13:
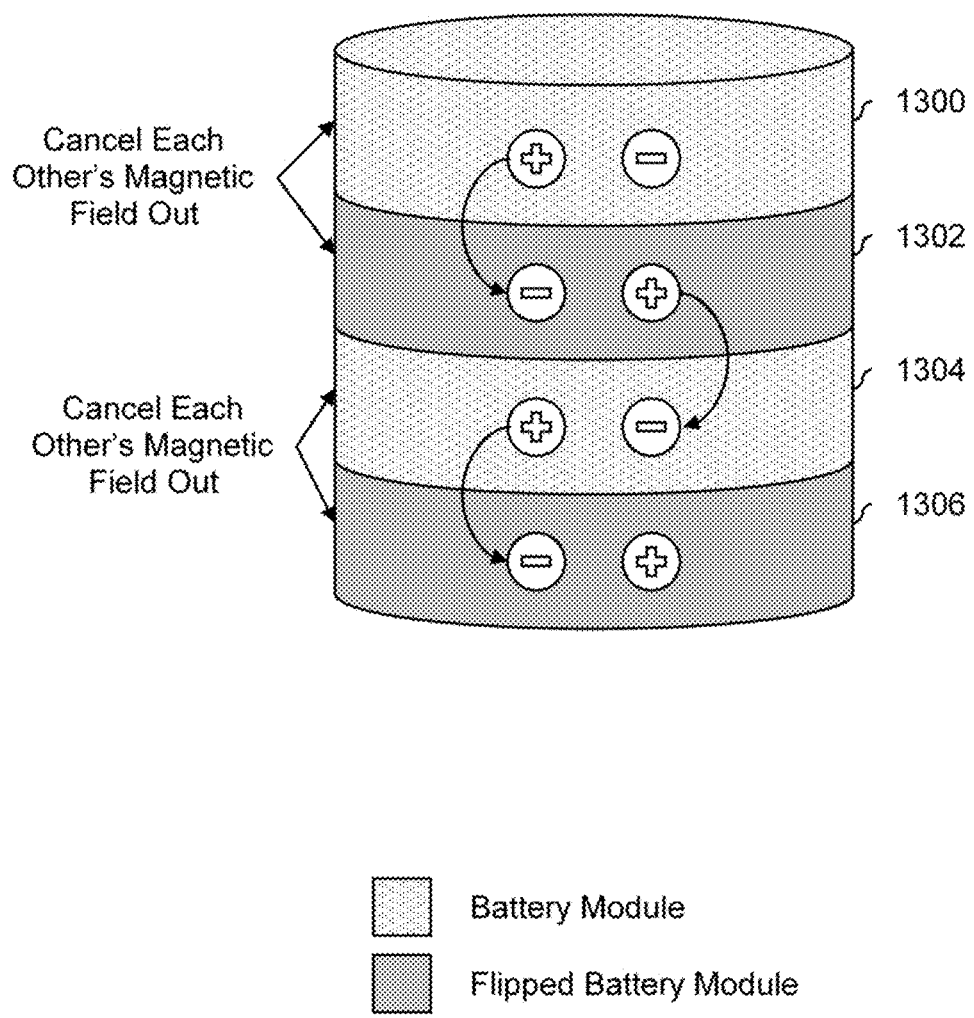
FIG. 13 is a diagram illustrating an embodiment of a cylindrical battery module.

FIG. 13 is a diagram illustrating an embodiment of a cylindrical battery module. In this example, the battery modules are cylindrically shaped where battery modules 1302 and 1306 are flipped or rotated versions of battery modules 1300 and 1304. As a result of their orientation and/or placement, battery modules 1300 and 1302 cancel each other's magnetic fields out and battery modules 1304 and 1306 cancel each other's magnetic fields out.

Figure 14:
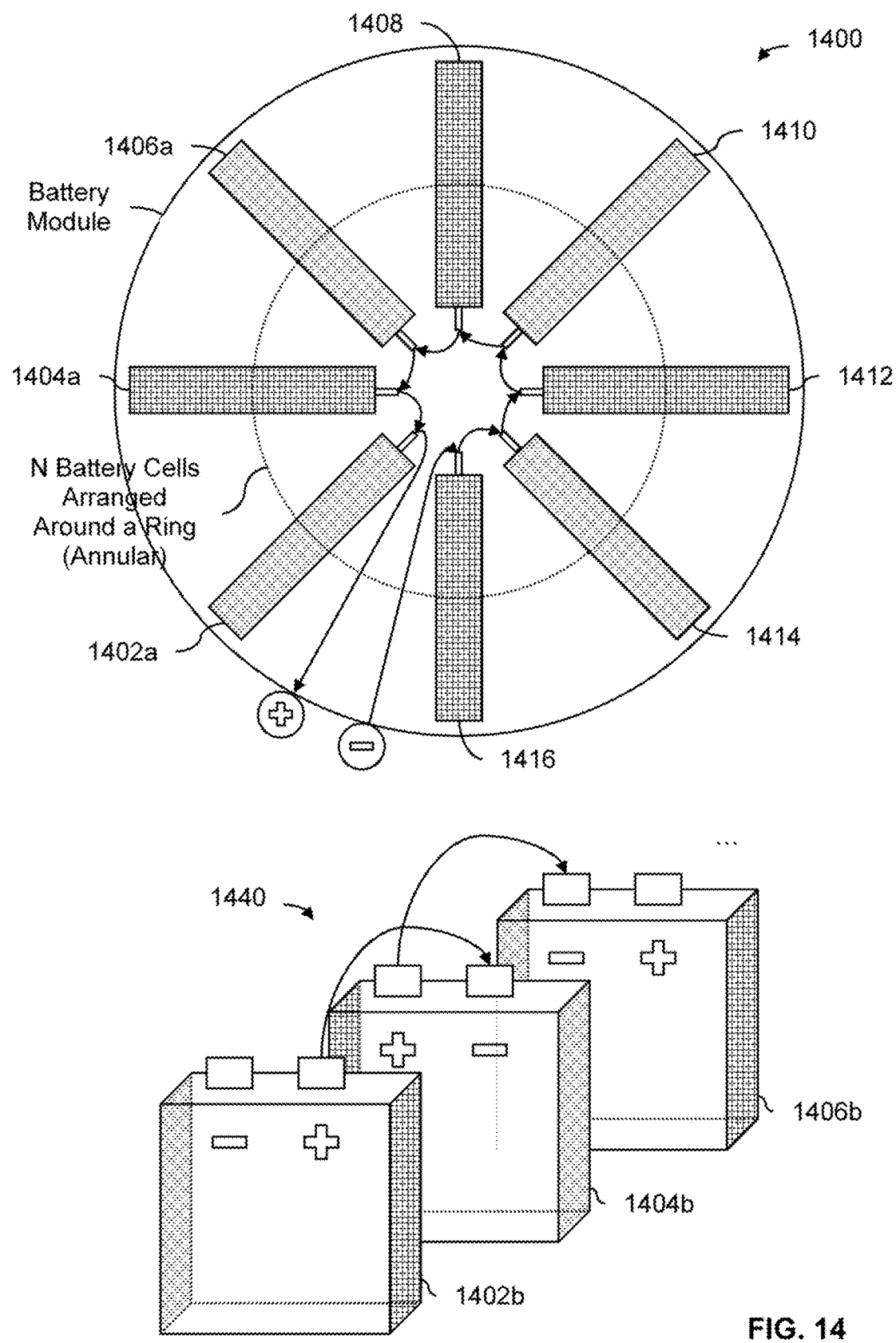
FIG. 14 is a diagram illustrating an embodiment of a cylindrical battery module with battery cells arranged on their sides within the battery module.

FIG. 14 is a diagram illustrating an embodiment of a cylindrical battery module with battery cells arranged on their sides within the battery module. Diagram 1400 shows a top view of how battery module 1300 and battery module 1304 may be implemented. (For brevity, the arrangement of battery cells in a flipped battery module is not shown since it can be determined from the diagram shown here.) In this example, battery cells 1402a, 1404a, 1406a, 1408, 1410, 1412, 1414, and 1416 are placed on their sides with their tabs facing inwards and the battery cells connected in series. Diagram 1440 shows some of the battery cells "unrolled" to better show the intracell connections between battery cells. As diagram 1440 shows, the positive output terminal of battery cell 1402b (which corresponds to battery cell 1402a in diagram 1400) is connected to the negative output terminal of battery cell 1404b, the positive output terminal of battery cell 1404b is connected to the negative output terminal of battery cell 1406b, and so on.

The magnetic field cancellation in this cylindrical example may not be as good as that in the rectangular cuboid example, but this configuration may be attractive and/or useful for certain applications and/or design constraints. For example, the density of battery cells will tend to be greater when packed as shown in FIG. 14, and so this type of configuration or embodiment may be used when a higher density is desired. In some embodiments, a cylindrically shaped battery module is preferable over a rectangular cuboid shape (e.g., the battery modules are going to be placed in a cylindrically shaped pylon).

These examples are described more generally and/or formally in flowcharts below.

Figure 15:
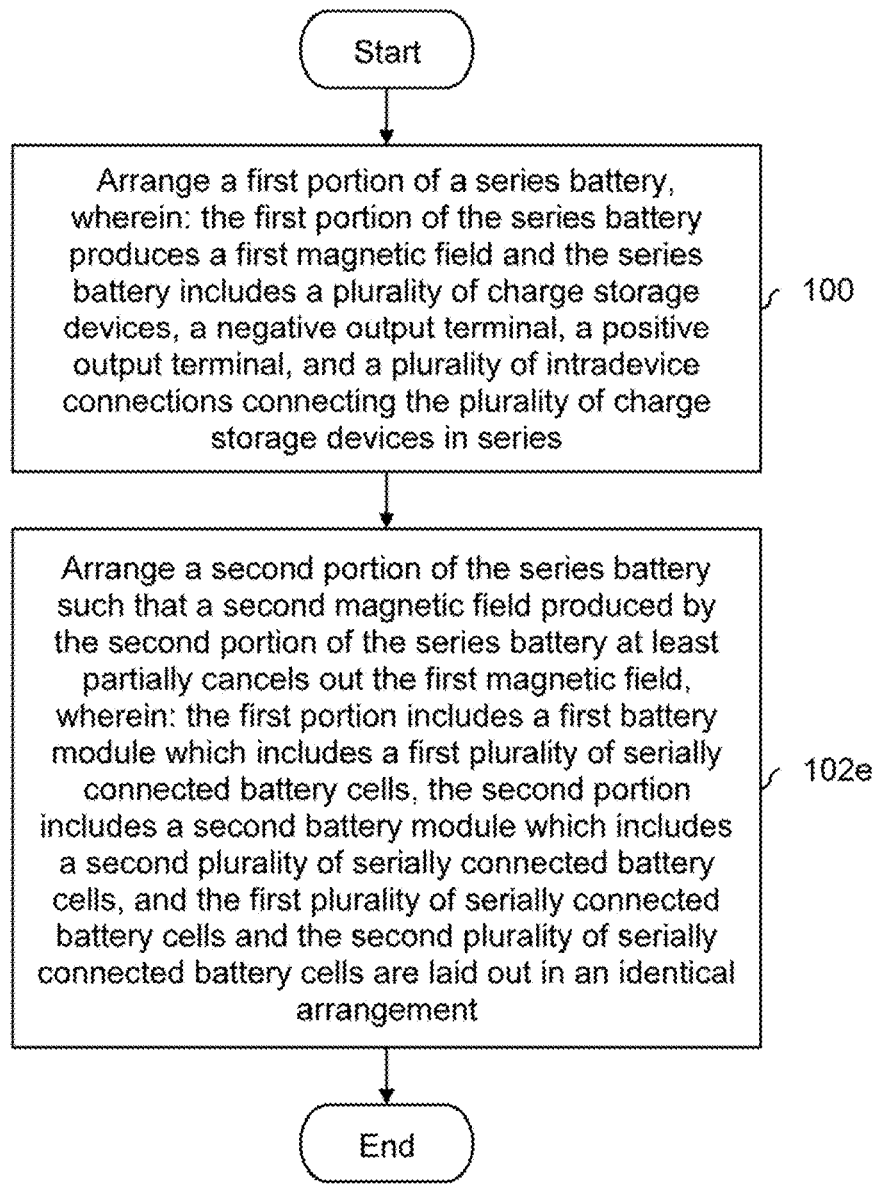
FIG. 15 is a flowchart illustrating an embodiment of a process to assemble a series battery with reduced interfering magnetic field using identically arranged battery modules.

FIG. 15 is a flowchart illustrating an embodiment of a process to assemble a series battery with reduced interfering magnetic field using identically arranged battery modules. FIG. 15 is related to FIG. 1 and for convenience similar reference numbers are used to show related steps.

At 100, a first portion of a series battery is arranged, wherein: the first portion of the series battery produces a first magnetic field and the series battery includes a plurality of charge storage devices, a negative output terminal, a positive output terminal, and a plurality of intradevice connections connecting the plurality of charge storage devices in series. For example, battery module 1100 in FIG. 11 shows one example of a first portion of a series battery and battery module 1300 in FIG. 13 shows another example.

At 102e, a second portion of the series battery is arranged such that a second magnetic field produced by the second portion of the series battery at least partially cancels out the first magnetic field, wherein: the first portion includes a first battery module which includes a first plurality of serially connected battery cells, the second portion includes a second battery module which includes a second plurality of serially connected battery cells, and the first plurality of serially connected battery cells and the second plurality of serially connected battery cells are laid out in an identical arrangement. For example, flipped battery module 1102 in FIG. 11 shows one example of a second portion of a series battery and flipped battery module 1302 in FIG. 13 shows another example. In both cases, the flipped battery module and non-flipped battery module have the same layout or arrangement of battery cells within. See, for example, FIG. 12 which shows that battery module 1200 and flipped battery module 1240 have the same arrangement or layout of battery cells.

In some embodiments, the battery cells and/or connections within a single battery module are arranged or otherwise laid out so that there is magnetic field cancellation between or amongst the battery cells and/or connections within the battery module. For example, the techniques described above may be used to reduce some total or combined magnetic field associated with a single battery module (see, e.g., FIGS. 2-10). This already reduced magnetic field (e.g., associated with a single battery module) may then be further reduced by arranging two battery modules next to each other as described at step 102*e*.

Alternatively, there may be little or no magnetic field cancellation between or amongst battery cells and/or connections in a single battery module. For example, other design considerations, such as capacity, a desired form factor or shape, etc. may dictate the layout of battery cells and connections within a battery module. In such embodiments, cancellation will occur at the battery module level between two adjacent battery modules as described at step 102*e*.

Figure 16:
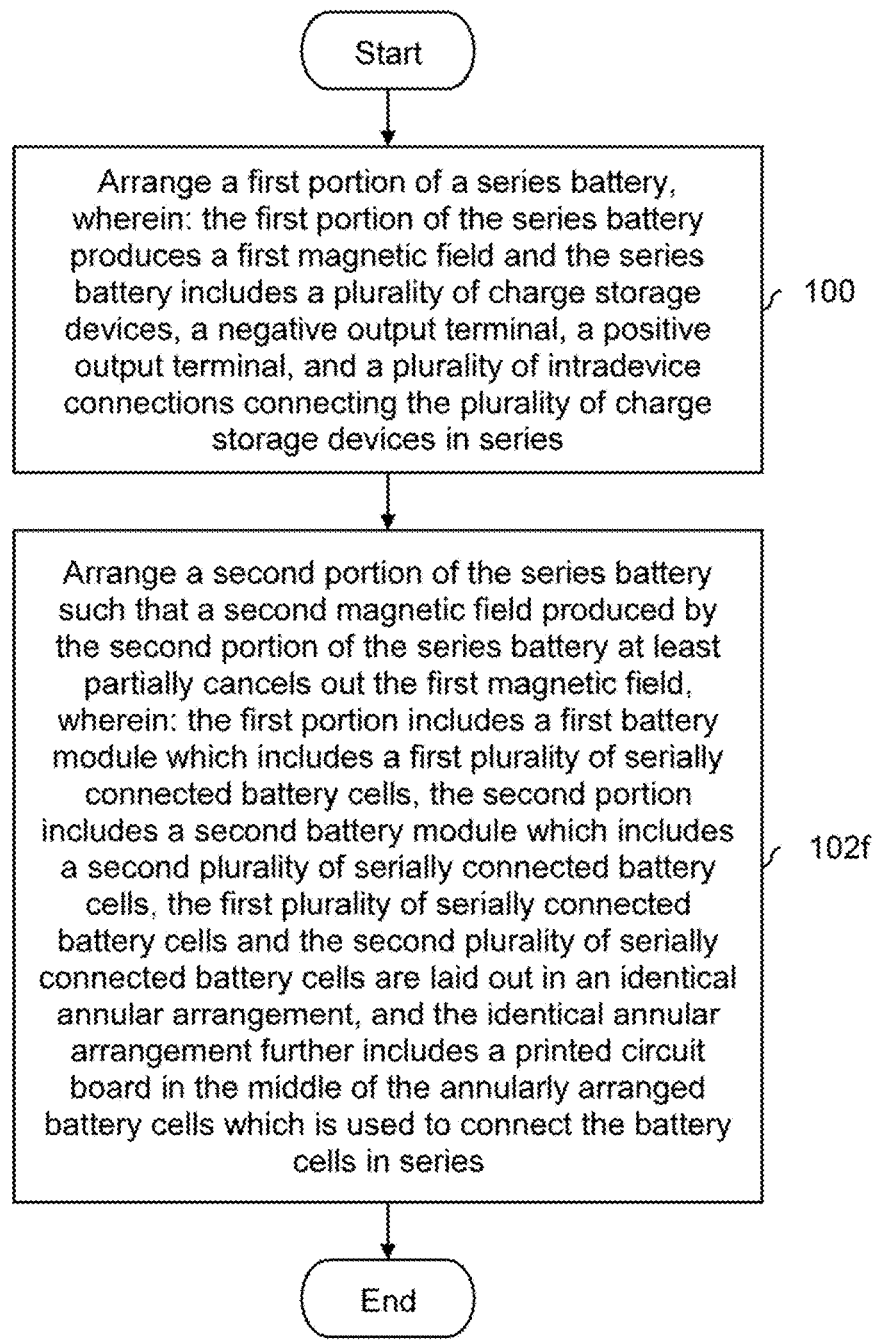
FIG. 16 is a flowchart illustrating an embodiment of a process to assemble a series battery with reduced interfering magnetic field using identical, annularly arranged battery modules with a printed circuit board.

FIG. 16 is a flowchart illustrating an embodiment of a process to assemble a series battery with reduced interfering magnetic field using identical, annularly arranged battery modules with a printed circuit board. FIG. 16 is related to FIG. 1 and for convenience similar reference numbers are used to show related steps.

At 100, a first portion of a series battery is arranged, wherein: the first portion of the series battery produces a first magnetic field and the series battery includes a plurality of charge storage devices, a negative output terminal, a positive output terminal, and a plurality of intradevice connections connecting the plurality of charge storage devices in series. See, for example battery module 1100 in FIG. 11 which shows one example of a first portion of a series battery.

At 102*f*, a second portion of the series battery is arranged such that a second magnetic field produced by the second portion of the series battery at least partially cancels out the first magnetic field, wherein: the first portion includes a first battery module which includes a first plurality of serially connected battery cells, the second portion includes a second battery module which includes a second plurality of serially connected battery cells, the first plurality of serially connected battery cells and the second plurality of serially connected battery cells are laid out in an identical annular arrangement, and the identical annular arrangement further includes a printed circuit board in the middle of the annularly arranged battery cells which is used to connect the battery cells in series.

See, for example, battery module 1102 in FIG. 11 which shows one example of a second portion of a series battery. As shown in FIG. 12, the battery cells inside the battery module are annularly arranged (e.g., about or around a circle) and there is a printed circuit board (1220*a*/1220*b*) which is used to connect the battery cells in series (e.g., the tabs of the battery cells are connected to the PCB and traces in the PCB connect a tab on one battery cell to the tab of another battery cell).

Figure 17:
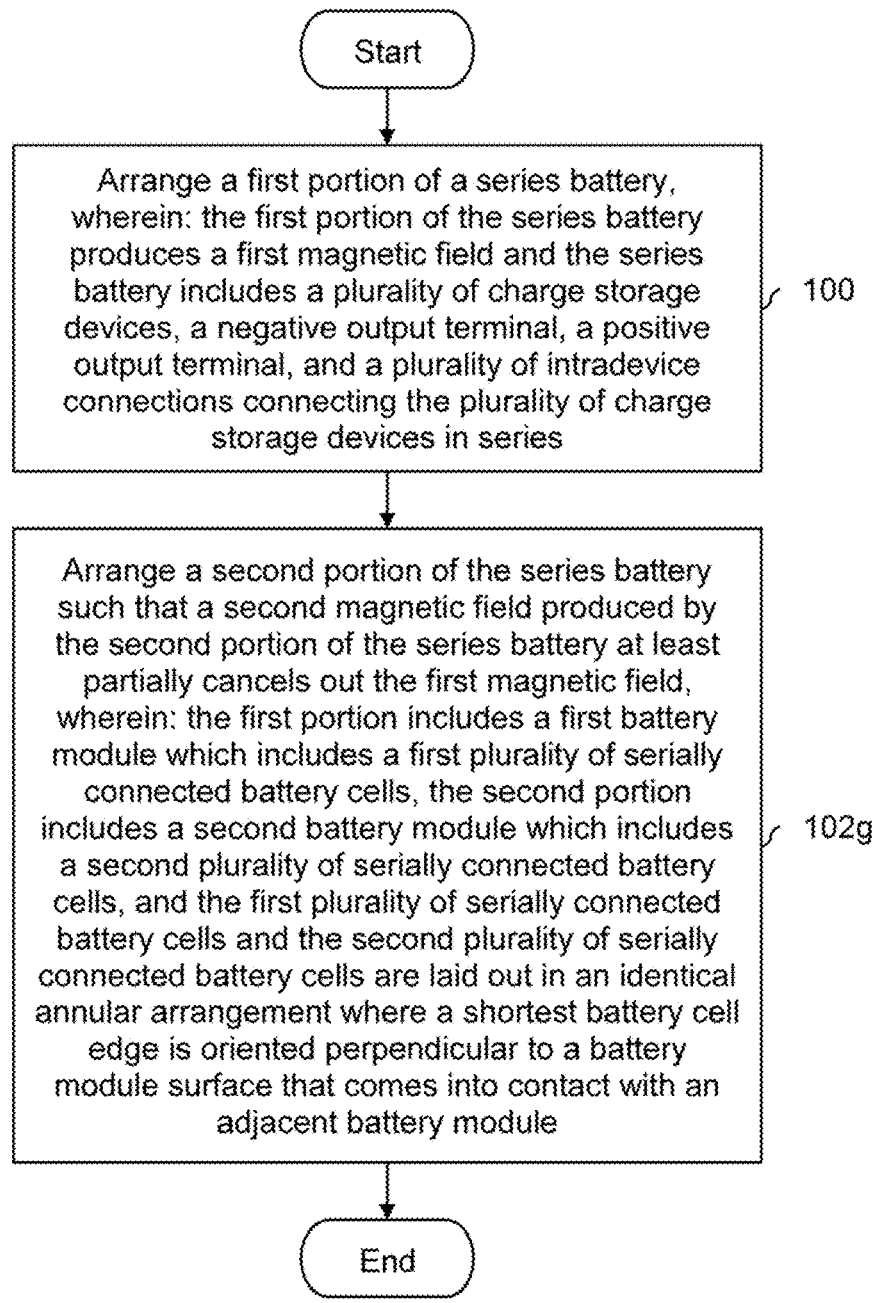
FIG. 17 is a flowchart illustrating an embodiment of a process to assemble a series battery with reduced interfering magnetic field using identically arranged battery modules with the battery cells laid out flat.

FIG. 17 is a flowchart illustrating an embodiment of a process to assemble a series battery with reduced interfering magnetic field using identically arranged battery modules with the battery cells laid out flat. FIG. 17 is related to FIG. 1 and for convenience similar reference numbers are used to show related steps.

At 100, a first portion of a series battery is arranged, wherein: the first portion of the series battery produces a first magnetic field and the series battery includes a plurality of charge storage devices, a negative output terminal, a positive output terminal, and a plurality of intradevice connections connecting the plurality of charge storage devices in series. See, for example battery module 1100 in FIG. 11 which shows one example of a first portion of a series battery.

At 102*g*, a second portion of the series battery is arranged such that a second magnetic field produced by the second portion of the series battery at least partially cancels out the first magnetic field, wherein: the first portion includes a first battery module which includes a first plurality of serially connected battery cells, the second portion includes a second battery module which includes a second plurality of serially connected battery cells, and the first plurality of serially connected battery cells and the second plurality of serially connected battery cells are laid out in an identical annular arrangement where a shortest battery cell edge is oriented perpendicular to a battery module surface that comes into contact with an adjacent battery module.

See, for example, battery module 1102 in FIG. 11 which shows one example of a second portion of a series battery. As shown in FIG. 12, shortest battery cell edge (which in that example comes out of the page) is perpendicular to the battery module surface that comes into contact with an adjacent battery (which in that example is parallel to the page). As described above, this ensures that adjacent battery modules are as close as possible to each other which is good for cancellation.

The following figures describe an example of a series battery which is used in a battery-powered aircraft and how the aircraft responds if one of the battery modules in the series battery fails.

Figure 18:
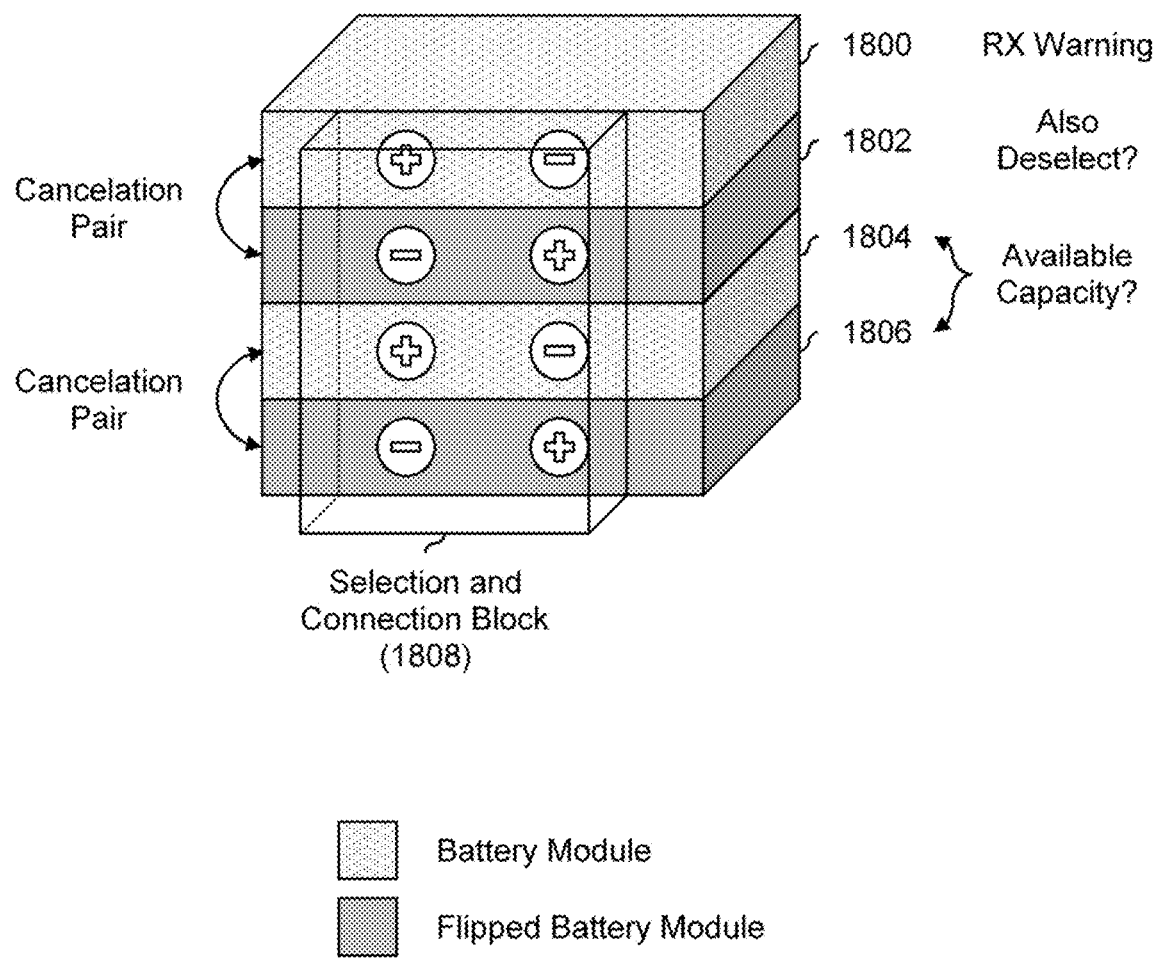
FIG. 18 is a diagram illustrating an embodiment of a series battery where a battery module is deselected under certain circumstances if its counterpart fails.

FIG. 18 is a diagram illustrating an embodiment of a series battery where a battery module is deselected under certain circumstances if its counterpart fails. In this example, the series battery shown is used in a battery-powered aircraft. The series battery in this example (e.g., initially) includes four battery modules (1800, 1802, 1804, and 1806) which are connected together in series. Selection and connection block (1808) includes components and/or logic which selects which battery modules are included in the series battery and correspondingly makes those electrical connections (e.g., the block may include diodes, switches, fuses, etc.). Initially, block 1808 is configured to include all four batteries (1800, 1802, 1804, and 1806) in the series battery. However, if desired, one or more of the battery modules may be electrically excluded from the series battery. In other words, the selection and connection block (1808) permits any combination of battery modules to be included in the series battery. This adaptable and/or configurable characteristic is desirable in an airplane where redundancy and safety are important considerations.

In this example, a warning is received for battery module 1800. For example, if the temperature of one of the battery modules gets very hot (e.g., exceeds some temperature threshold), then that can be an indication that the battery module has failed or is otherwise not functioning properly. In some cases, a failing battery emits fumes and a chemical detector is used to detect the presence of certain chemical(s) thus indicating that the battery is emitting fumes. Any appropriate technique to detect a failing or malfunctioning battery module may be used.

In response to the warning, the battery module 1800 will no longer be included in the series battery (e.g., by appropriately configuring selection and connection block 1808). In addition, the system decides whether or not to also electrically exclude the other battery module in the cancellation pair, battery module 1802. One benefit to excluding battery module 1802 is that battery module 1802 will not emit an interfering magnetic field (e.g., since battery module 1800, which received the warning, will no longer be canceling the magnetic field of its partner in the cancellation pair).

However, if the remaining capacity in the system is relatively low, then it may be worthwhile to include battery module 1802 in the series battery, even if it emits some interfering magnetic field. This is especially true with aircraft which perform vertical takeoff and landing (e.g., such aircraft have their rotors oriented like a helicopter with the top of the rotor pointing upwards). Vertical landings are very power intensive and require a large current draw.

Therefore, in this example, the decision is based on the available (e.g., current) capacity associated with the other and/or remaining battery modules. For example, the system may estimate or measure the total Ampere hours associated with the battery modules 1804 and 1806 (e.g., the other and/or remaining battery modules) and compare the available capacity against a threshold. The threshold may correspond to an amount of capacity (e.g., plus some margin) associated with returning to some base station (e.g., the aircraft estimates/measures its distance from the base station and the threshold is based at least in part on that distance) and/or performing a vertical landing (e.g., this may be a configured or set value). In other words, the system decides, "Will I be able to return to ground safely if both the battery module associated with the warning and its partner in the cancellation pair were excluded from the series battery?" If the available capacity is sufficient, then selection and connection block 1808 is configured to exclude both battery module 1800 (for which the warning was received) and battery module 1802 (its partner) from the series battery. If the available capacity is not sufficient, then only battery module 1800 associated with the warning is electrically excluded from the series battery.

This example is described more formally and/or generally in a flowchart below.

Figure 19:
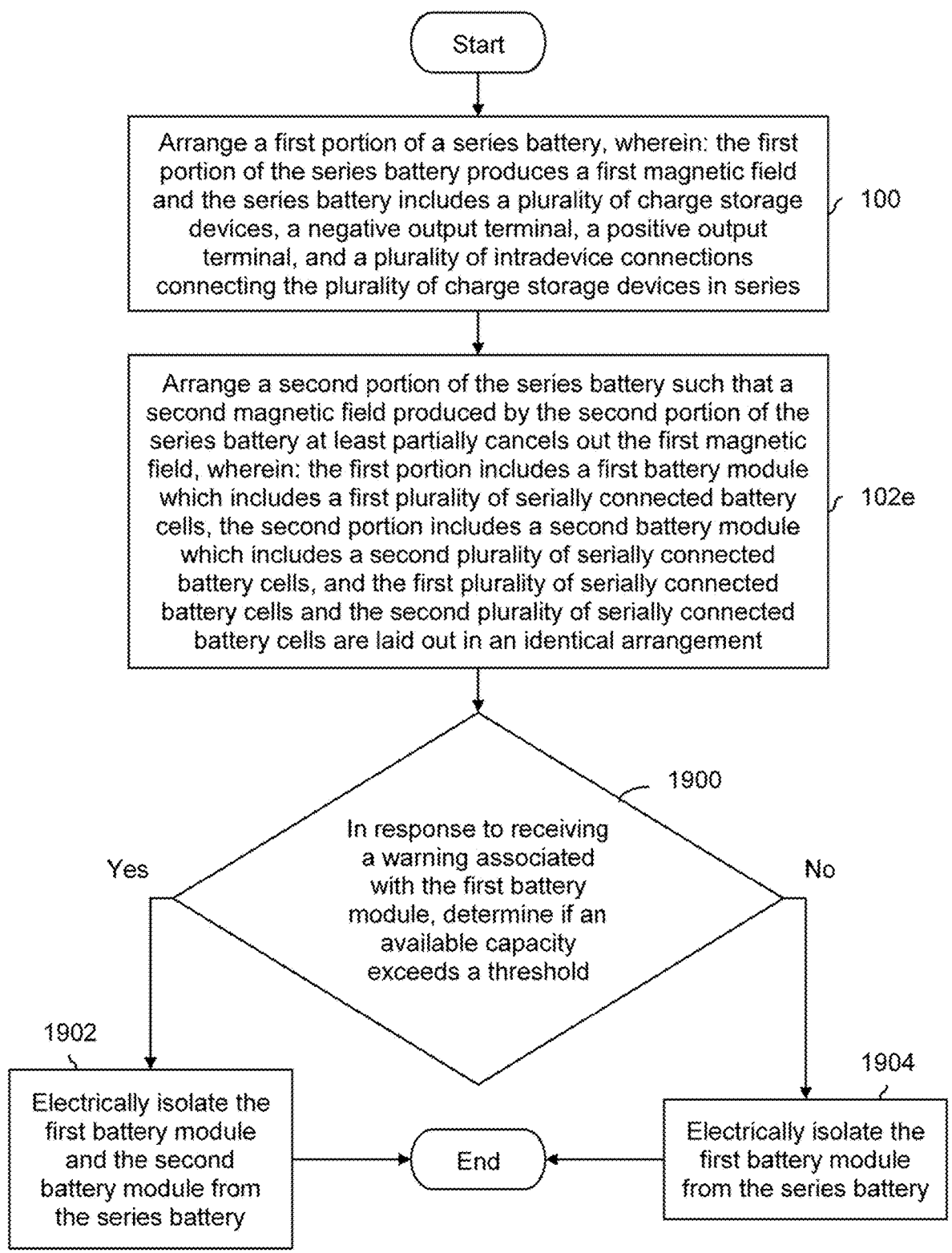
FIG. 19 is a flowchart illustrating an embodiment of a process to electrically isolate one or more battery modules in response to a warning.

FIG. 19 is a flowchart illustrating an embodiment of a process to electrically isolate one or more battery modules in response to a warning. FIG. 19 is related to FIG. 1 and FIG. 15 and for convenience similar reference numbers are used to show related steps.

At 100, a first portion of a series battery is arranged, wherein: the first portion of the series battery produces a first magnetic field and the series battery includes a plurality of charge storage devices, a negative output terminal, a positive output terminal, and a plurality of intradevice connections connecting the plurality of charge storage devices in series. For example, in FIG. 18, battery module 1800 shows an example of a first portion of a series battery which produces a first magnetic field.

At 102e, a second portion of the series battery is arranged such that a second magnetic field produced by the second portion of the series battery at least partially cancels out the first magnetic field, wherein: the first portion includes a first battery module which includes a first plurality of serially connected battery cells, the second portion includes a second battery module which includes a second plurality of serially connected battery cells, and the first plurality of serially connected battery cells and the second plurality of serially connected battery cells are laid out in an identical arrangement. For example, in FIG. 18, flipped battery module 1802 shows an example of a second portion of a series battery where the magnetic fields of battery module 1800 and flipped battery module 1802 cancel each other out.

At 1900, in response to receiving a warning associated with the first battery module, it is determined if an available capacity exceeds a threshold. As described above, the warning may be triggered if the temperature of the battery modules exceeds some temperature threshold, or if certain chemicals have been detected (e.g., within the case of one of the battery modules). In the example of FIG. 18, a warning is received for battery module 1800 and the available capacity is associated with battery module 1804 and battery module 1806 (e.g., the other and/or remaining battery modules, exclusive of the battery module for which a warning was received and its partner).

If it is determined at step 1900 that the available capacity exceeds the threshold, then the first battery module and the second battery module are electrically isolated from the series battery at 1902. For example, in FIG. 19, the system has determined that battery module 1804 and battery module 1806 have enough power or charge to (as an example) safely return to ground and so battery module 1800 and battery module 1802 are excluded from the series battery in order to minimize the interfering magnetic field put out by the series battery.

If it is determined at step 1900 that the available capacity does not exceed the threshold, then the first battery module is electrically isolated from the series battery at 1904. For example, if the threshold is associated with having enough power or charge to safely return to ground, then the system has decided that it needs the power or current from the second battery module and cannot isolate it from the series (e.g., even if some victim device will pick up more interfering magnetic field).

Returning briefly to FIG. 18, selection and connection block 1808 shows an example of a component which performs step 1902 and/or step 1904. In some embodiments, some controller (e.g., a flight computer or flight controller) performs step 1900 and instructs and/or configures the selection and connection block accordingly based on its decision or result.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A series battery, comprising:
    a first row of plurality of charge storage devices including
        a first set of non-adjacent charge storage devices and a
        second set of non-adjacent charge storage devices;
    a first intradevice connection which connects the first set
        of non-adjacent charge storage devices;
    a second intradevice connection which connects the second set of non-adjacent charge storage devices,
    wherein the first set of non-adjacent charge storage
        devices and the second set of non-adjacent charge
        storage devices are mutually exclusive,
    wherein the first intradevice connection and the second
        intradevice connection at least partially overlap such
        that a second magnetic field produced by the second set
        of non-adjacent charge storage devices at least partially
        cancels out a first magnetic field produced by the first
        set of non-adjacent charge storage devices,
    wherein a direction of current flow of the first intradevice
        connection is opposite to a direction of current flow of
        the second intradevice connection; and
    a second row of plurality of charge storage devices
        positioned in front of and parallel to the first row of
        plurality of charge storage devices, the second row of
        plurality of charge storage devices including a third set
        of non-adjacent charge storage devices and a fourth set
        of non-adjacent charge storage devices;
    a third intradevice connection which connects the third set
        of non-adjacent charge storage devices;
    a fourth intradevice connection which connects the fourth
        set of non-adjacent charge storage devices, wherein the third set of non-adjacent charge storage devices and the fourth set of non-adjacent charge storage devices are mutually exclusive, wherein the third intradevice connection at least partially overlaps with the fourth intradevice connection, wherein a direction of current flow of the third intradevice connection is opposite to a direction of current flow of the fourth intradevice connection and a direction of current flow of the first intradevice connection such that a third magnetic field produced by the third set of non-adjacent charge storage devices at least partially cancels out a fourth magnetic field produced by the fourth set of non-adjacent charge storage devices and further cancels out the first magnetic field produced by the first set of non-adjacent charge storage devices, and wherein the first row of plurality of charge storage devices and the second row of plurality of charge storage devices each include at least two adjacent charge storage devices having a same orientation.

2. The series battery of claim 1, wherein:

the first set of non-adjacent charge storage devices includes a first charge storage device and a second charge storage device, the first charge storage device having a positive tab on a top surface and a negative tab on an opposite bottom surface; and the second charge storage device having a negative tab on a top surface and a positive tab on an opposite bottom surface.

3. The series battery of claim 2, wherein:

the second set of non-adjacent charge storage devices includes a third charge storage device and a fourth charge storage device, the third charge storage device having a negative tab on a top surface and a positive tab on an opposite bottom surface;

the fourth charge storage device having a positive tab on a top surface and a negative tab on an opposite bottom surface.

4. The series battery of claim 3, wherein the third charge storage device is placed between the first charge storage device and the second charge storage device, and the second charge storage device is placed between the third charge storage device and the fourth charge storage device.

5. The series battery of claim 1, wherein:

the first set of non-adjacent charge storage devices includes a first charge storage device and a second charge storage device, the first charge storage device and the second charge storage device each has a negative tab on a first portion of a top surface and a positive tab on a second portion of the top surface opposite from the first portion.

6. The series battery of claim 5, wherein:

the second set of non-adjacent charge storage devices includes a third charge storage device and a fourth charge storage device, the third charge storage device and the fourth charge storage device each has a positive tab on a first portion of a top surface and a negative tab on a second portion of the top surface opposite from the first portion, wherein the first portion of the top surface is on a same side on the first charge storage device, the second charge storage device, the third charge storage device and the fourth charge storage device.

7. The series battery of claim 6, wherein the third charge storage device is placed between the first charge storage device and the second charge storage device, and the second charge storage device is placed between the third charge storage device and the fourth charge storage device.

8. The series battery of claim 1, further comprising:

a negative output terminal; and a positive output terminal.

9. The series battery of claim 1, wherein the first intradevice connection is parallel to the second intradevice connection.

10. The series battery of claim 1, wherein the first set of non-adjacent charge storage devices in interleaved with the second set of non-adjacent charge storage devices such that a charge storage device in the first set of non-adjacent charge storage devices is followed by another charge storage device in the second set of non-adjacent charge storage devices.

11. The series battery of claim 1, wherein a first magnetic field associated with the first intradevice connection cancels out a second magnetic field associated with the second intradevice connection at least where the first intradevice connection overlaps with the second intradevice connection.

* * * * *